US010153971B2

(12) United States Patent
Guo

(10) Patent No.: US 10,153,971 B2
(45) Date of Patent: Dec. 11, 2018

(54) DATA TRANSMISSION METHOD AND ENTITY

(71) Applicant: Huawei Technologies Co., Ltd., Shenzhen (CN)

(72) Inventor: Yali Guo, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 231 days.

(21) Appl. No.: 15/078,386

(22) Filed: Mar. 23, 2016

(65) Prior Publication Data

US 2016/0226764 A1 Aug. 4, 2016

Related U.S. Application Data

(63) Continuation of application No. PCT/CN2013/083969, filed on Sep. 23, 2013.

(51) Int. Cl.
*H04L 12/741* (2013.01)
*H04L 29/06* (2006.01)
(Continued)

(52) U.S. Cl.
CPC .......... *H04L 45/74* (2013.01); *H04L 69/22* (2013.01); *H04W 4/70* (2018.02); *H04W 40/246* (2013.01); *H04W 76/12* (2018.02)

(58) Field of Classification Search
CPC .......... H04L 45/00; H04L 69/00; H04W 4/00; H04W 40/00
See application file for complete search history.

(56) References Cited

U.S. PATENT DOCUMENTS

2013/0084894 A1* 4/2013 Jain ................. H04W 4/70
455/458
2013/0308564 A1* 11/2013 Jain ................. H04B 15/00
370/329
(Continued)

FOREIGN PATENT DOCUMENTS

CN 102333293 A 1/2012
CN 102340826 A 2/2012
(Continued)

OTHER PUBLICATIONS

3rd Generation Partnership Project; Technical Specification Group Services and System Aspects; Study on Enhancements for MTC ; (Release 11), 3GPP TSG-SA WG1 Meeting #57, S1-120348, Kyoto, Japan, Feb. 13-17, 2012.*

(Continued)

*Primary Examiner* — Andrew Lai
*Assistant Examiner* — Sumitra Ganguly
(74) *Attorney, Agent, or Firm* — Slater Matsil, LLP

(57) ABSTRACT

A data transmission method and a data transmission entity are disclosed. Embodiments include receiving, by a first MTC-IWF entity, first control plane signaling from a first mobility management entity, where the first control plane signaling carries a data packet that is from first UE, and wherein a target UE of the data packet is a second UE, determining, first route information, where the first route information is used for indicating a second network side device that serves second UE and sending, by the first MTC-IWF entity to the second network side device according to the first route information, second control plane signaling carrying the data packet so that the second network side device sends the data packet to the second UE.

14 Claims, 8 Drawing Sheets

(51) Int. Cl.
*H04W 40/24* (2009.01)
*H04W 4/70* (2018.01)
*H04W 76/12* (2018.01)

(56) References Cited

U.S. PATENT DOCUMENTS

2014/0219183 A1* 8/2014 Xu .................... H04W 4/70
370/329
2014/0220987 A1 8/2014 Wu

FOREIGN PATENT DOCUMENTS

| CN | 103052045 | A | 4/2013 |
| CN | 103108358 | A | 5/2013 |
| EP | 2365678 | A1 | 9/2011 |
| EP | 2605606 | A2 | 6/2013 |
| WO | 2012152017 | A1 | 11/2012 |
| WO | 2013040962 | A1 | 3/2013 |
| WO | 2013066350 | A1 | 5/2013 |

OTHER PUBLICATIONS

3GPP TR 23.887 V1.0.0, 3rd Generation Partnership Project;Technical Specification Group Services and System Aspects; Machine-Type and other Mobile Data Applications Communications Enhancements (Release 12), Technical Report, Jun. 2013, 133 pages.
ZTE: "Use of generic NAS transport for small data", 3GPP SA WG2 Meeting #92, Jul. 9-13, 2012—Barcelona, Spain, Work Item / Release: MTCe-SDDTE / Rel-12, 20120713, S2-122846, 6 pages.

* cited by examiner

Control plane ------
User plane ———

DATA TRANSMISSION METHOD AND ENTITY

This application is a continuation of International Application No. PCT/CN2013/083969, filed on Sep. 23, 2013, which is hereby incorporated by reference in its entirety.

TECHNICAL FIELD

The present invention relates to the field of communications, and in particular embodiments, to a data transmission method and an entity.

BACKGROUND

A machine type communication (MTC) application refers to an application for network communication performed by one or more network elements if no human participation is required, such as traffic control and management, remote meter reading, remote monitoring, mobile payment, locating and tracing, or medical monitoring.

An MTC terminal may communicate with an MTC application server or an MTC application service platform by using a mobile communications network. Currently, in order to exchange a data packet of a small data volume between the MTC terminal and an MTC server by using the mobile communications network, a machine type communication-interworking function (MTC-IWF) entity is introduced. The MTC terminal can exchange a data packet of a small data volume with the MTC server on a control plane by using the MTC-IWF entity. However, this solution supports only data exchange between an MTC terminal and an MTC server; for exchange of a data packet of a small data volume between MTC terminals, a user plane bearer still needs to be established by using the mobile communications network. In this way, large quantities of control plane resources and user plane resources need to be used to establish a bearer for two MTC terminals to transmit a data packet of a small data volume, leading to a waste of network resources.

SUMMARY

Embodiments of the present invention provide a data transmission method and an entity, which can save network resources.

According to a first aspect, a data transmission method is provided, including: receiving, by a first machine type communication-interworking function MTC-IWF entity, first control plane signaling from a first mobility management entity, where the first control plane signaling carries a data packet that is from first UE, and a target receive end of the data packet is second UE; determining, by the first MTC-IWF entity, first route information, where the first route information is used for indicating a second network side device that serves the second UE; and sending, by the first MTC-IWF entity to the second network side device according to the first route information, second control plane signaling carrying the data packet, so that the second network side device sends the data packet to the second UE.

With reference to the first aspect, in a first possible implementation manner, the determining, by the first MTC-IWF entity, route information includes: sending, by the first MTC-IWF entity to a user subscription database entity, a first request message used for requesting the first route information; and receiving, by the first MTC-IWF entity, the first route information that is determined by the user subscription database entity according to the first request message.

With reference to the first possible implementation manner of the first aspect, in a second possible implementation manner, the first route information is used for indicating a second mobility management entity that serves the second UE; and sending, by the first MTC-IWF entity to the second network side device according to the first route information, second control plane signaling carrying the data packet includes: sending, by the first MTC-IWF entity, the second control plane signaling to the second mobility management entity according to the first route information, so that the second mobility management entity sends the data packet to the second UE.

With reference to the first possible implementation manner of the first aspect, in a third possible implementation manner, the first route information is used for indicating a second MTC-IWF entity that serves the second UE; and sending, by the first MTC-IWF entity to the second network side device according to the first route information, second control plane signaling carrying the data packet includes: sending, by the first MTC-IWF entity, the second control plane signaling to the second MTC-IWF entity according to the first route information, so that the second MTC-IWF entity sends the data packet to the second UE by using a second mobility management entity, where the second mobility management entity serves the second UE.

With reference to the first aspect, in a fourth possible implementation manner, the determining, by the first MTC-IWF entity, first route information includes: sending, by the first MTC-IWF entity to a user subscription database entity, a first request message used for requesting the first route information; and receiving, by the first MTC-IWF entity, the first route information that is sent according to the first request message by a second MTC-IWF entity that serves the second UE, where the first request message is forwarded by the user subscription database entity to the second MTC-IWF entity, and the first route information is used for indicating the second MTC-IWF entity.

With reference to the first aspect, in a fifth possible implementation manner, the determining, by the first MTC-IWF entity, first route information includes: sending, by the first MTC-IWF entity to a user subscription database entity, a first request message used for requesting the first route information; and receiving, by the first MTC-IWF entity, the first route information that is sent according to a second request message by a second MTC-IWF entity that serves the second UE, where the first route information is used for indicating the second MTC-IWF entity, the second request message is used for instructing to send the first route information to the first MTC-IWF entity, and the second request message is sent by the user subscription database entity to the second MTC-IWF entity according to the first request message.

With reference to the fourth possible implementation manner or the fifth possible implementation manner of the first aspect, in a sixth possible implementation manner, the sending, by the first MTC-IWF entity to the second network side device according to the first route information, second control plane signaling carrying the data packet includes: sending, by the first MTC-IWF entity, the second control plane signaling to the second MTC-IWF entity according to the first route information, so that the second MTC-IWF entity sends the data packet to the second UE by using a second mobility management entity, where the second mobility management entity serves the second UE.

With reference to the first aspect, in a seventh possible implementation manner, the determining, by the first MTC-IWF entity, first route information includes: parsing, by the first MTC-IWF entity, the data packet, to acquire information about the second UE or a service identifier; and determining, by the first MTC-IWF entity, the first route information according to the information about the second UE or the service identifier, where the first route information is used for indicating an MTC server that serves the second UE.

With reference to the seventh possible implementation manner of the first aspect, in an eighth possible implementation manner, the sending, by the first MTC-IWF entity to the second network side device according to the first route information, second control plane signaling carrying the data packet includes: sending, by the first MTC-IWF entity, the second control plane signaling to the MTC server according to the first route information, so that the MTC server sends the data packet to the second UE by using a second MTC-IWF entity, where the second MTC-IWF entity serves the second UE.

According to a second aspect, a data transmission method is provided, including: receiving, by a second machine type communication-interworking function MTC-IWF entity, second control plane signaling that is sent by a first MTC-IWF entity according to first route information, where the second control plane signaling carries a data packet that is from first UE, a target receive end of the data packet is second UE, the first route information is used for indicating the second MTC-IWF entity, and the second MTC-IWF entity serves the second UE; determining, by the second MTC-IWF entity, second route information, where the second route information is used for indicating a second mobility management entity that serves the second UE; and sending, by the second MTC-IWF entity to the second mobility management entity according to the second route information, third control plane signaling carrying the data packet, so that the second mobility management entity sends the data packet to the second UE.

With reference to the second aspect, in a first possible implementation manner, the determining, by the second MTC-IWF entity, second route information includes: sending, by the second MTC-IWF entity, a third request message to a user subscription database entity, where the third request message is used for requesting the second route information; and receiving, by the second MTC-IWF entity, the second route information that is sent by the user subscription database entity according to the third request message.

According to a third aspect, a data transmission method is provided, including: determining, by a second MTC-IWF entity, second route information, where the second route information is used for indicating a second mobility management entity, and the second MTC-IWF entity and the second mobility management entity both serve second UE; sending, by the second MTC-IWF entity, first route information to a first MTC-IWF entity, where the first route information is used for indicating the second MTC-IWF entity; receiving, by the second MTC-IWF entity, second control plane signaling that is sent by the first MTC-IWF entity according to the first route information, where the second control plane signaling carries a data packet that is from first UE, and a target receive end of the data packet is the second UE; and sending, by the second MTC-IWF entity to the second mobility management entity according to the second route information, third control plane signaling carrying the data packet, so that the second mobility management entity sends the data packet to the second UE.

With reference to the third aspect, in a first possible implementation manner, before the determining, by a second MTC-IWF entity, second route information, the method further includes: receiving, by the second MTC-IWF entity, a first request message from a user subscription database entity, where the first request message is received by the user subscription database entity from the first MTC-IWF entity, and the first request message is used for requesting the first route information.

With reference to the first possible implementation manner of the third aspect, in a second possible implementation manner, the sending, by the second MTC-IWF entity, first route information to the first MTC-IWF entity includes: sending, by the second MTC-IWF entity, the first route information to the first MTC-IWF entity according to the first request message.

With reference to the first possible implementation manner or the second possible implementation manner of the third aspect, in a third possible implementation manner, the determining, by the second MTC-IWF entity, second route information includes: sending, by the second MTC-IWF entity, a third request message to the user subscription database entity according to the first request message, where the third request message is used for requesting the second route information; and receiving, by the second MTC-IWF entity, the second route information that is sent by the user subscription database entity according to the third request message.

With reference to the third aspect, in a fourth possible implementation manner, before the determining, by a second MTC-IWF entity, second route information, the method further includes: receiving, by the second MTC-IWF entity, a second request message from a user subscription database entity, where the second request message is used for instructing to send the first route information to the first MTC-IWF entity, the second request message is sent by the user subscription database entity according to a first request message, the first request message is received by the user subscription database entity from the first MTC-IWF entity, and the first request message is used for requesting the first route information.

With reference to the fourth possible implementation manner of the third aspect, in a fifth possible implementation manner, the sending, by the second MTC-IWF entity, first route information to the first MTC-IWF entity includes: sending, by the second MTC-IWF entity, the first route information to the first MTC-IWF entity according to the second request message.

With reference to the third possible implementation manner or the fourth possible implementation manner of the third aspect, in a sixth possible implementation manner, the determining, by the second MTC-IWF entity, second route information includes: acquiring, by the second MTC-IWF entity, the second route information carried in the second request message.

According to a fourth aspect, a data transmission method is provided, including: receiving, by a user subscription database entity from a first MTC-IWF entity, a first request message used for requesting first route information, where the first route information is used for indicating a second network side device that serves second UE, the first request message is sent by the first MTC-IWF entity after the first MTC-IWF entity receives first control plane signaling from a first mobility management entity, the first control plane signaling carries a data packet that is from first UE, and a target receive end of the data packet is the second UE; determining, by the user subscription database entity, the first route information according to the first request message; and sending, by the user subscription database entity, the first route information to the first MTC-IWF entity, so that the first MTC-IWF entity sends, to the second network side device according to the first route information, second control plane signaling carrying the data packet, and the second network side device sends the data packet to the second UE.

With reference to the fourth aspect, in a first possible implementation manner, the first route information is used for indicating a second mobility management entity that serves the second UE.

With reference to the fourth aspect, in a second possible implementation manner, the first route information is used for indicating a second MTC-IWF entity that serves the second UE.

With reference to the second possible implementation manner of the fourth aspect, in a third possible implementation manner, the method further includes: receiving, by the user subscription database entity, a third request message from the second MTC-IWF entity, where the third request message is used for requesting second route information, and the second route information is used for indicating a second mobility management entity that serves the second UE; determining, by the user subscription database entity, the second route information according to the third request message; and sending, by the user subscription database entity, the second route information to the second MTC-IWF entity.

According to a fifth aspect, a data transmission method is provided, including: receiving, by a user subscription database entity from a first MTC-IWF entity, a first request message used for requesting first route information, where the first request message is sent by the first MTC-IWF entity after the first MTC-IWF entity receives first control plane signaling from a first mobility management entity, the first control plane signaling carries a data packet that is from first UE, and a target receive end of the data packet is second UE; and instructing, by the user subscription database entity according to the first request message, a second MTC-IWF entity to send the first route information to the first MTC-IWF entity, where the first route information is used for indicating the second MTC-IWF entity, so that the first MTC-IWF entity sends, to the second MTC-IWF entity according to the first route information, second control plane signaling carrying the data packet, and the second MTC-IWF entity sends the data packet to the second UE.

With reference to the fifth aspect, in a first possible implementation manner, the instructing, by the user subscription database entity according to the first request message, a second MTC-IWF entity to send the first route information to the first MTC-IWF entity includes: forwarding, by the user subscription database entity, the first request message to the second MTC-IWF entity.

With reference to the first possible implementation manner of the fifth aspect, in a second possible implementation manner, the method further includes: receiving, by the user subscription database entity, a third request message that is sent by the second MTC-IWF entity according to the first request message, where the third request message is used for requesting second route information, and the second route information is used for indicating a second mobility management entity that serves the second UE; and sending, by the user subscription database entity, the second route information to the second MTC-IWF entity according to the third request message.

With reference to the fifth aspect, in a third possible implementation manner, the instructing, by the user subscription database entity according to the first request message, a second MTC-IWF entity to send the first route information to the first MTC-IWF entity includes: sending, by the user subscription database entity, a second request message to the second MTC-IWF entity according to the first request message, where the second request message is used for instructing to send the first route information to the first MTC-IWF entity.

With reference to the third possible implementation manner of the fifth aspect, in a fourth possible implementation manner, the second request message further carries second route information, and the second route information is used for indicating a second mobility management entity that serves the second UE.

According to a sixth aspect, an MTC-IWF entity is provided, including: a receiving unit, configured to receive first control plane signaling from a first mobility management entity, where the first control plane signaling carries a data packet that is from first UE, and a target receive end of the data packet is second UE; a determining unit, configured to determine first route information, where the first route information is used for indicating a second network side device that serves the second UE; and a sending unit, configured to send, to the second network side device according to the first route information, second control plane signaling carrying the data packet, so that the second network side device sends the data packet to the second UE.

With reference to the sixth aspect, in a first possible implementation manner, the determining unit is specifically configured to: send, to a user subscription database entity by using the sending unit, a first request message used for requesting the first route information; and receive, by using the receiving unit, the first route information that is determined by the user subscription database entity according to the first request message.

With reference to the first possible implementation manner of the sixth aspect, in a second possible implementation manner, the first route information is used for indicating a second mobility management entity that serves the second UE; and the sending unit is specifically configured to send the second control plane signaling to the second mobility management entity according to the first route information, so that the second mobility management entity sends the data packet to the second UE.

With reference to the first possible implementation manner of the sixth aspect, in a third possible implementation manner, the first route information is used for indicating a second MTC-IWF entity that serves the second UE; and the sending unit is specifically configured to send the second control plane signaling to the second MTC-IWF entity according to the first route information, so that the second MTC-IWF entity sends the data packet to the second UE by using a second mobility management entity, where the second mobility management entity serves the second UE.

With reference to the sixth aspect, in a fourth possible implementation manner, the determining unit is specifically configured to: send, to a user subscription database entity by using the sending unit, a first request message used for requesting the first route information; and receive, by using the receiving unit, the first route information that is sent according to the first request message by a second MTC-IWF entity that serves the second UE, where the first request message is forwarded by the user subscription database entity to the second MTC-IWF entity, and the first route information is used for indicating the second MTC-IWF entity.

With reference to the sixth aspect, in a fifth possible implementation manner, the determining unit is specifically configured to: send, to a user subscription database entity by using the sending unit, a first request message used for requesting the first route information; and receive, by using the receiving unit, the first route information that is sent according to a second request message by a second MTC-IWF entity that serves the second UE, where the first route information is used for indicating the second MTC-IWF entity, the second request message is used for instructing to send the first route information to the MTC-IWF entity, and the second request message is sent by the user subscription database entity to the second MTC-IWF entity according to the first request message.

With reference to the fourth possible implementation manner or the fifth possible implementation manner of the sixth aspect, in a sixth possible implementation manner, the sending unit is specifically configured to send the second control plane signaling to the second MTC-IWF entity according to the first route information, so that the second MTC-IWF entity sends the data packet to the second UE by using a second mobility management entity, where the second mobility management entity serves the second UE.

With reference to the sixth aspect, in a seventh possible implementation manner, the determining unit is specifically configured to parse the data packet, to acquire information about the second UE or a service identifier; and determine the first route information according to the information about the second UE or the service identifier, where the first route information is used for indicating an MTC server that serves the second UE.

With reference to the seventh possible implementation manner of the sixth aspect, in an eighth possible implementation manner, the sending unit is specifically configured to send the second control plane signaling to the MTC server according to the first route information, so that the MTC server sends the data packet to the second UE by using a second MTC-IWF entity, where the second MTC-IWF entity serves the second UE.

According to a seventh aspect, an MTC-IWF entity is provided, including: a receiving unit, configured to receive second control plane signaling that is sent by a first MTC-IWF entity according to first route information, where the second control plane signaling carries a data packet that is from first UE, a target receive end of the data packet is second UE, the first route information is used for indicating the MTC-IWF entity, and the MTC-IWF entity serves the second UE; a determining unit, configured to determine second route information, where the second route information is used for indicating a second mobility management entity that serves the second UE; and a sending unit, configured to send, to the second mobility management entity according to the second route information, third control plane signaling carrying the data packet, so that the second mobility management entity sends the data packet to the second UE.

With reference to the seventh aspect, in a first possible implementation manner, the determining unit is specifically configured to: send a third request message to a user subscription database entity by using the sending unit, where the third request message is used for requesting the second route information; and receive, by using the receiving unit, the second route information that is sent by the user subscription database entity according to the third request message.

According to an eighth aspect, an MTC-IWF entity is provided, including: a determining unit, configured to determine second route information, where the second route information is used for indicating a second mobility management entity, and the MTC-IWF entity and the second mobility management entity both serve second UE; a sending unit, configured to send first route information to a first MTC-IWF entity, where the first route information is used for indicating the MTC-IWF entity; and a receiving unit, configured to receive second control plane signaling that is sent by the first MTC-IWF entity according to the first route information, where the second control plane signaling carries a data packet that is from first UE, and a target receive end of the data packet is the second UE, where the sending unit is further configured to send, to the second mobility management entity according to the second route information, third control plane signaling carrying the data packet, so that the second mobility management entity sends the data packet to the second UE.

With reference to the eighth aspect, in a first possible implementation manner, the receiving unit is further configured to: before the determining unit determines the second route information, receive a first request message from a user subscription database entity, where the first request message is received by the user subscription database entity from the first MTC-IWF entity, and the first request message is used for requesting the first route information.

With reference to the first possible implementation manner of the eighth aspect, in a second possible implementation manner, the sending unit is specifically configured to send the first route information to the first MTC-IWF entity according to the first request message.

With reference to the first possible implementation manner or the second possible implementation manner of the eighth aspect, in a third possible implementation manner, the determining unit is specifically configured to: send, by using the sending unit, a third request message to the user subscription database entity according to the first request message, where the third request message is used for requesting the second route information; and receive, by using the receiving unit, the second route information that is sent by the user subscription database entity according to the third request message.

With reference to the eighth aspect, in a fourth possible implementation manner, the receiving unit is further configured to: before the determining unit determines the second route information, receive a second request message from a user subscription database entity, where the second request message is used for instructing to send the first route information to the first MTC-IWF entity, the second request message is sent by the user subscription database entity according to a first request message, the first request message is received by the user subscription database entity from the first MTC-IWF entity, and the first request message is used for requesting the first route information.

With reference to the fourth possible implementation manner of the eighth aspect, in a fifth possible implementation manner, the sending unit is specifically configured to send the first route information to the first MTC-IWF entity according to the second request message.

With reference to the fourth possible implementation manner or the fifth possible implementation manner of the eighth aspect, in a sixth possible implementation manner, the determining unit is specifically configured to acquire the second route information carried in the second request message.

According to a ninth aspect, a user subscription database entity is provided, including: a receiving unit, configured to receive, from a first MTC-IWF entity, a first request message used for requesting first route information, where the first route information is used for indicating a second network side device that serves second UE, the first request message is sent by the first MTC-IWF entity after the first MTC-IWF entity receives first control plane signaling from a first mobility management entity, the first control plane signaling carries a data packet that is from first UE, and a target receive end of the data packet is the second UE; a determining unit, configured to determine the first route information according to the first request message; and a sending unit, configured to send the first route information to the first MTC-IWF entity, so that the first MTC-IWF entity sends, to the second network side device according to the first route information, second control plane signaling carrying the data packet, and the second network side device sends the data packet to the second UE.

With reference to the ninth aspect, in a first possible implementation manner, the first route information is used for indicating a second mobility management entity that serves the second UE.

With reference to the ninth aspect, in a second possible implementation manner, the first route information is used for indicating a second MTC-IWF entity that serves the second UE.

With reference to the second possible implementation manner of the ninth aspect, in a third possible implementation manner, the receiving unit is further configured to receive a third request message from the second MTC-IWF entity, where the third request message is used for requesting second route information, and the second route information is used for indicating a second mobility management entity that serves the second UE; the determining unit is further configured to determine the second route information according to the third request message; and the sending unit is further configured to send the second route information to the second MTC-IWF entity according to the third request message.

According to a tenth aspect, a user subscription database entity is provided, including: a receiving unit, configured to receive, from a first MTC-IWF entity, a first request message used for requesting first route information, where the first request message is sent by the first MTC-IWF entity after the first MTC-IWF entity receives first control plane signaling from a first mobility management entity, the first control plane signaling carries a data packet that is from first UE, and a target receive end of the data packet is second UE; and a sending unit, configured to instruct, according to the first determining message, a second MTC-IWF entity to send the first route information to the first MTC-IWF entity, where the first route information is used for indicating the second MTC-IWF entity, so that the first MTC-IWF entity sends, to the second MTC-IWF entity according to the first route information, second control plane signaling carrying the data packet, and the second MTC-IWF entity sends the data packet to the second UE.

With reference to the tenth aspect, in a first possible implementation manner, the sending unit is specifically configured to forward the first request message to the second MTC-IWF entity.

With reference to the first possible implementation manner of the tenth aspect, in a second possible implementation manner, the user subscription database entity further includes: a determining unit, where the receiving unit is further configured to receive a third request message that is sent by the second MTC-IWF entity according to the first request message, where the third request message is used for requesting second route information, and the second route information is used for indicating a second mobility management entity that serves the second UE; the determining unit is configured to determine the second route information according to the third request message; and the sending unit is further configured to send the second route information to the second MTC-IWF entity.

With reference to the tenth aspect, in a third possible implementation manner, the sending unit is specifically configured to send a second request message to the second MTC-IWF entity according to the first request message, where the second request message is used for instructing to send the first route information to the first MTC-IWF entity.

With reference to the third possible implementation manner of the tenth aspect, in a fourth possible implementation manner, the second request message further carries second route information, and the second route information is used for indicating a second mobility management entity that serves the second UE.

In the embodiments of the present invention, a first MTC-IWF entity receives, from a first mobility management entity, first control plane signaling carrying a data packet of first UE, and sends, to a second network side device according to first route information, second control plane signaling carrying the data packet, so that the second network side device can send the data packet to second UE, without requiring to establish a user plane bearer for the first UE and the second UE, thereby saving network resources.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, and a Universal Mobile Telecommunications System (UMTS) system.

In the embodiments of the present invention, user equipment (UE), also referred to as a mobile terminal (MT), mobile user equipment, and the like, may communicate with one or more core networks by using a radio access network (RAN). The user equipment may be a mobile terminal, for example, a mobile phone (also referred to as a "cellular" phone), or a computer with a mobile terminal. For example, the user equipment may be a portable, pocket-sized, handheld, computer built-in, or in-vehicle mobile apparatus.

Figure 1:
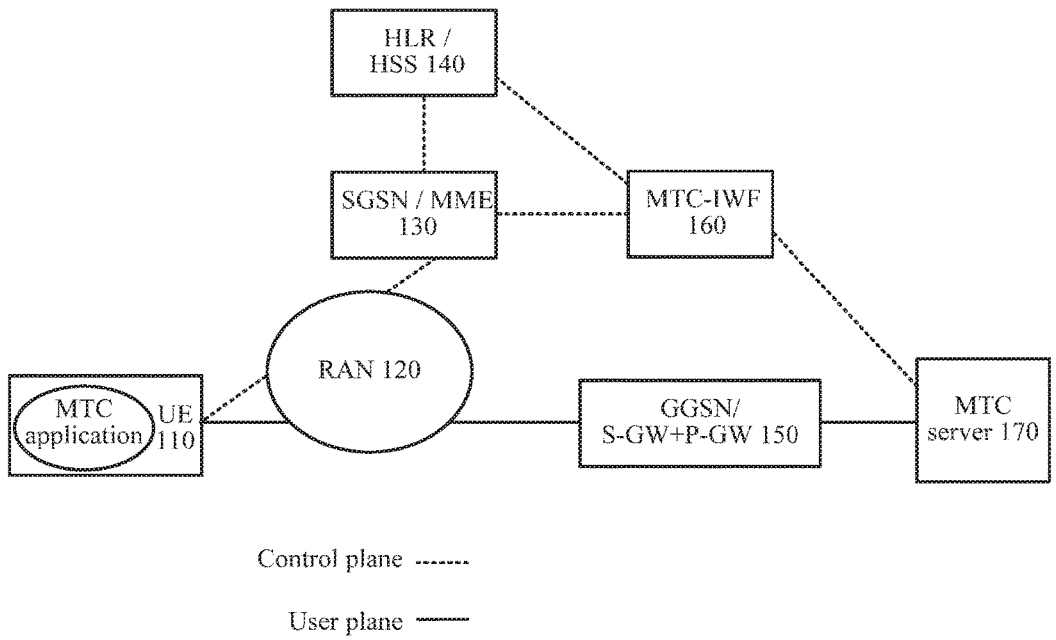
FIG. 1 is a schematic diagram of a network architecture to which an embodiment of the present invention may be applied.

FIG. 1 is a schematic diagram of a network architecture to which an embodiment of the present invention may be applied. It should be noted that, an example in FIG. 1 is merely intended to help a person skilled in the art to better understand the embodiments of the present invention rather than to limit the scope of the embodiments of the present invention.

As shown in FIG. 1, UE 110 may be an MTC terminal that supports an MTC application.

For a system architecture evolution (System Architecture Evolution, SAE) communications system, a core network may include a mobility management entity (MME), a serving gateway (S-GW), a packet data network gateway (P-GW), and a home subscriber server (HSS).

For a UMTS, a core network may include a serving general packet radio service support node (SGSN), a gateway general packet radio service support node (GGSN), and a home location register (HLR).

In the network architecture shown in FIG. 1, the UE 110 may communicate with a core network by using a radio access network (RAN) 120. Specifically, the UE 110 may be connected to an SGSN/MME 130 by using the RAN 120, and may be connected to a GGSN/S-GW+P-GW 150 by using the SGSN/MME 130. The SGSN/MME 130 may be connected to an HLR/HSS 140; both the SGSN/MME 130 and HLR/HSS 140 may be connected to an MTC-IWF entity 160. The MTC-IWF entity 160 and the GGSN/S-GW+P-GW 150 may be connected to an MTC server 170.

Therefore, the UE 110 may communicate with the MTC-IWF 160 by using the SGSN/MME 130, and therefore can exchange data with the MTC server 170 by using the MTC-IWF 160. In the network architecture, the UE 110 may further exchange, by using a device in the core network and the MTC-IWF 160, data with another UE that supports an MTC application. A data transmission method in an embodiment of the present invention is described in detail below.

Figure 2:
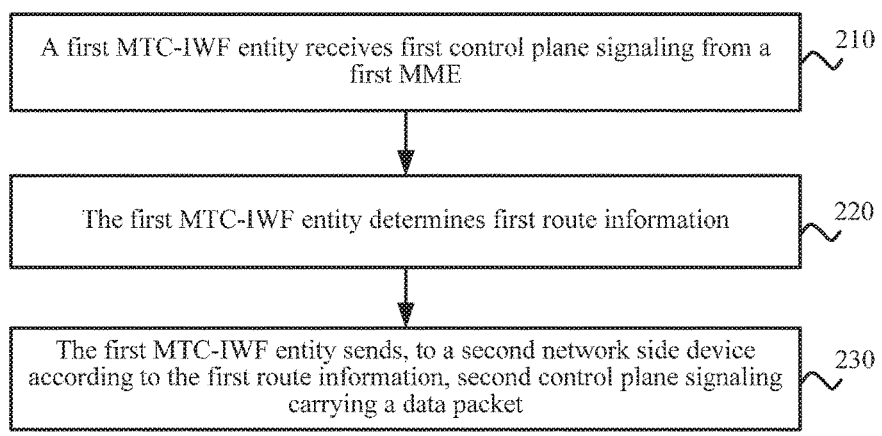
FIG. 2 is a schematic flowchart of a data transmission method according to an embodiment of the present invention.

FIG. 2 is a schematic flowchart of a data transmission method according to an embodiment of the present invention. The method in FIG. 2 is executed by an MTC-IWF, for example, may be performed by the MTC-IWF 160 in FIG. 1.

210: A first MTC-IWF entity receives first control plane signaling from a first mobility management entity, where the first control plane signaling carries a data packet that is from first UE, and a target receive end of the data packet is second UE.

Both the first UE and the second UE may be MTC terminals that support an MTC application. Both the first MTC-IWF entity and the first mobility management entity may serve the first UE.

The first MTC-IWF entity may be located in a home network of the first UE.

Before step 210, the first mobility management entity may receive the data packet from the first UE; for example, the first MME may receive, from the first UE, a non-access stratum (NAS) message carrying the data packet. The first mobility management entity may send the data packet to the first MTC-IWF entity by using control plane signaling; for example, the data packet may carry an identifier of the first UE, and the first mobility management entity may determine an address of the first MTC-IWF entity according to the identifier of the first UE, and then, send the data packet to the first MTC-IWF entity.

In this embodiment of the present invention, the data packet may refer to a data packet of a small data volume, for example, a data packet that occupies only several bytes; the data packet may be a data packet that the first UE needs to transmit to the second UE. That is, a data packet of a small data volume needs to be exchanged between the first UE and the second UE.

220: The first MTC-IWF entity determines first route information, where the first route information is used for indicating a second network side device that serves the second UE.

In order to send the data packet to the second UE, the first MTC-IWF entity may determine the second network side device that serves the second UE, that is, may determine the first route information. For example, the first route information may include an identifier of the second network side device, an Internet Protocol (Internet Protocol, IP) address of the second network side device, or the like. The second network side device may be a network element that can communicate with the first MTC-IWF entity, for example, may be a mobility management entity or an MTC-IWF entity that serves the second UE.

230: The first MTC-IWF entity sends, to the second network side device according to the first route information, second control plane signaling carrying the data packet, so that the second network side device sends the data packet to the second UE.

The first MTC-IWF entity may send, to the second network side device according to the first route information, the second control plane signaling carrying the data packet, and therefore can send the data packet to the second UE by using the second network side device.

As can be seen, in this embodiment of the present invention, data exchange between the first UE and the second UE may be implemented by using a control plane. Specifically, the first MTC-IWF entity receives, from the first MME, the first control plane signaling carrying the data packet of the first UE, and sends, to the second network side device according to the first route information, the second control plane signaling carrying the data packet, so that the second network side device can send the data packet to the second UE. Therefore, in this embodiment of the present invention, a user plane bearer does not need to be established for the first UE and the second UE in a mobile communications network to implement data transmission between the first UE and the second UE, thereby reducing network resources required for establishing the user plane bearer. This embodiment of the present invention is particularly applicable to a scenario in which a data packet of a small data volume is exchanged infrequently.

In this embodiment of the present invention, a first MTC-IWF entity receives, from a first mobility management entity, first control plane signaling carrying a data packet of first UE, and sends, to a second network side device according to first route information, second control plane signaling carrying the data packet, so that the second network side device can send the data packet to second UE, without requiring to establish a user plane bearer for the first UE and the second UE, thereby saving network resources.

It should be noted that, in this embodiment of the present invention, the first UE and the second UE may belong to a same home network, or may belong to different home networks; or the first UE may be in a roaming state, that is, the first UE is in a roaming network of the first UE, and the second UE may also be in a roaming state, that is, the second UE may be in a roaming network of the second UE, which is not limited in this embodiment of the present invention.

In a different system, the mobility management entity in this embodiment of the present invention may be a different entity. For example, in an LTE system, the mobility management entity may be an MME; in a UMTS, the mobility management entity may be an SGSN.

Optionally, as an embodiment, in step 220, the first MTC-IWF entity may send, to a user subscription database entity, a first request message used for requesting the first route information. The first MTC-IWF entity may receive the first route information that is determined by the user subscription database entity according to the first request message.

The user subscription database entity may be an entity of a database in which subscription information of the second UE is stored. In a different system, the user subscription database entity in this embodiment of the present invention may be a different entity. For example, in the LTE system, the user subscription database entity may be an HSS; in the UMTS, the user subscription database may be an HLR.

The first MTC-IWF entity may request the first route information from the user subscription database entity. For example, the data packet may carry information about the second UE. For example, the information about the second UE may include an identifier of the second UE, an IP address of the second UE, or the like. Therefore, the first MTC-IWF entity may add the information about the second UE to the first request message. In this way, the user subscription database entity may determine the corresponding first route information according to the information about the second UE.

Optionally, as another embodiment, the first route information may be used for indicating a second mobility management entity that serves the second UE. In step 230, the first MTC-IWF entity may send the second control plane signaling to the second mobility management entity according to the first route information, so that the second mobility management entity sends the data packet to the second UE.

For example, when the second UE is in a home network of the second UE, that is, in a case in which the second UE is in a non-roaming state, a user subscription database entity may return, to the first MTC-IWF entity, the first route information used for indicating the second mobility management entity.

For example, the first route information may include an identifier of the second mobility management entity or an IP address of the second mobility management entity. In this way, the first MTC-IWF entity may send, to the second mobility management entity, the second control plane signaling carrying the data packet, and the second mobility management entity sends the data packet to the second UE. For example, the second mobility management entity may send the data packet to the second UE by using a NAS message.

As can be seen, this embodiment is applicable to a scenario in which the second UE is in a home network of the second UE. In some cases, for example, in a case in which neither the first UE nor the second UE roams, but both are located in a same home network, the first mobility management entity and the second mobility management entity may be a same mobility management entity.

Optionally, as another embodiment, the first route information may be used for indicating a second MTC-IWF entity that serves the second UE. In step 230, the first MTC-IWF entity may send the second control plane signaling to the second MTC-IWF entity according to the first route information, so that the second MTC-IWF entity sends the data packet to the second UE by using a second mobility management entity, where the second mobility management entity serves the second UE.

For example, when the second UE is in a roaming network of the second UE, that is, when the second UE is in a roaming state, a user subscription database entity may return, to the first MTC-IWF entity, the first route information for indicating the second MTC-IWF entity that serves the second UE. The second MTC-IWF entity may be located in a home network of the second UE.

For example, the first route information may include an identifier of the second MTC-IWF entity or an IP address of the second MTC-IWF entity. The first MTC-IWF entity may send, to the second MTC-IWF entity, the second control plane signaling carrying the data packet, and the second MTC-IWF entity may acquire second route information from the user subscription database entity, where the second route information may indicate a second mobility management entity that serves the second UE. In this way, the second MTC-IWF entity may send the data packet to the second mobility management entity by using control plane signaling, and the second mobility management entity sends the data packet to the second UE. For example, the second mobility management entity may send the data packet to the second UE by using a NAS message.

As can be seen, this embodiment is applicable to a scenario in which the second UE roams. In some cases, for example, when the second UE and the first UE belong to a same home network, the first MTC-IWF entity and the second MTC-IWF entity may be a same MTC-IWF entity.

Optionally, as another embodiment, in step 220, the first MTC-IWF entity may send, to a user subscription database entity, a first request message used for requesting the first route information. The first MTC-IWF entity may receive the first route information that is sent according to the first request message by a second MTC-IWF entity that serves the second UE, where the first request message is forwarded by the user subscription database entity to the second MTC-IWF entity, and the first route information is used for indicating the second MTC-IWF entity.

Specifically, the first MTC-IWF entity may send the first request message to the user subscription database entity. For example, the first request message may include information about the second UE, for example, may include an identifier or an IP address of the second UE.

The user subscription database entity may forward the first request message to the second MTC-IWF entity according to the information about the second UE. For example, when the second UE is in a roaming network of the second UE, the user subscription database entity may forward the request message to the second MTC-IWF entity. In this way, it may also be understood as that the first MTC-IWF entity sends the first request message to the second MTC-IWF entity; therefore, the second MTC-IWF entity may return route information of the second MTC-IWF entity to the first MTC-IWF entity according to the first request message. For example, the first route information may include an identifier of the second MTC-IWF entity or an IP address of the second MTC-IWF entity. As described above, the second MTC-IWF entity may be in a home network of the second UE.

This embodiment is applicable to a scenario in which the second UE is in a roaming network of the second UE.

Optionally, as another embodiment, in step 220, the first MTC-IWF entity may send, to a user subscription database entity, a first request message used for requesting the first route information. The first MTC-IWF entity may receive the first route information that is sent according to a second request message by a second MTC-IWF entity that serves the second UE, where the second request message is used for instructing to send the first route information to the first MTC-IWF entity, the second request message is sent by the user subscription database entity to the second MTC-IWF entity according to the first request message, and the first route information is used for indicating the second MTC-IWF entity.

Specifically, the first MTC-IWF entity may send the first request message to the user subscription database entity. For example, the first request message may include information about the second UE, for example, may include an identifier or an IP address of the second UE. The user subscription database entity may send the second request message to the second MTC-IWF entity according to the first request message, to instruct to send route information of the second MTC-IWF entity to the first MTC-IWF entity. The second request message may include information about the first MTC-IWF entity, for example, may include an identifier of the first MTC-IWF entity or an IP address of the first MTC-IWF entity. In this way, the second MTC-IWF entity may send the first route information to the first MTC-IWF entity according to the identifier or the IP address of the first MTC-IWF entity. In addition, the second request message may carry second route information, where the second route information may indicate a second MME that serves the second UE.

Optionally, as another embodiment, in a case in which the first MTC-IWF entity receives the first route information from the second MTC-IWF entity, in step 230, the first MTC-IWF entity may send the second control plane signaling to the second MTC-IWF entity according to the first route information, so that the second MTC-IWF entity sends the data packet to the second UE by using a second mobility management entity, where the second mobility management entity serves the second UE.

The first MTC-IWF entity may send, to the second MTC-IWF entity, the second control plane signaling carrying the data packet. In this way, the second MTC-IWF entity may send, by using third control plane signaling, the data packet to the second mobility management entity that serves the second UE, and the second mobility management entity sends the data packet to the second UE. For example, the second mobility management entity may send the data packet to the second UE by using a NAS message. The second MTC-IWF entity may request, from the user subscription database entity, the second route information used for indicating the second MME. Alternatively, the second request message may carry the second route information. In this way, the second MTC-IWF entity may directly acquire the second route information from the second request message.

Optionally, as another embodiment, in step 220, the first MTC-IWF entity may parse the data packet, to acquire information about the second UE or a service identifier; the first MTC-IWF entity may determine the first route information according to the information about the second UE or the service identifier, where the first route information is used for indicating an MTC server that serves the second UE.

Specifically, the first MTC-IWF entity may parse the data packet, to acquire the information about the second UE or the service identifier in the data packet. The information about the second UE may include an identifier of the second UE, an IP address of the second UE, or the like. The service identifier, for example, may be an application layer identifier in the exchanged data packet. For example, if the data packet is initiated by an instant messaging application, the service identifier is an identifier of the instant messaging application.

The first MTC-IWF entity may determine, according to the information about the second UE or the service identifier, the MTC server that serves the second UE, that is, determine route information of the MTC server. For example, the first route information may include an identifier or an IP address of the MTC server.

Optionally, as another embodiment, after the first MTC-IWF entity determines, according to the information about the second UE or the service identifier, the first route information used for indicating the MTC server that serves the second UE, in step 230, the first MTC-IWF entity may send the second control plane signaling to the MTC server according to the first route information, so that the MTC server sends the data packet to the second UE by using a second MTC-IWF entity, where the second MTC-IWF entity serves the second UE.

Specifically, the first MTC-IWF entity may send, to the MTC server, the second control plane signaling carrying the data packet; then, the MTC server may send, by using control plane signaling, the data packet to the second MTC-IWF entity that serves the second UE; the second MTC-IWF entity may send the data packet to a second mobility management entity that serves the second UE; and the second mobility management entity sends the data packet to the second UE.

Figure 3:
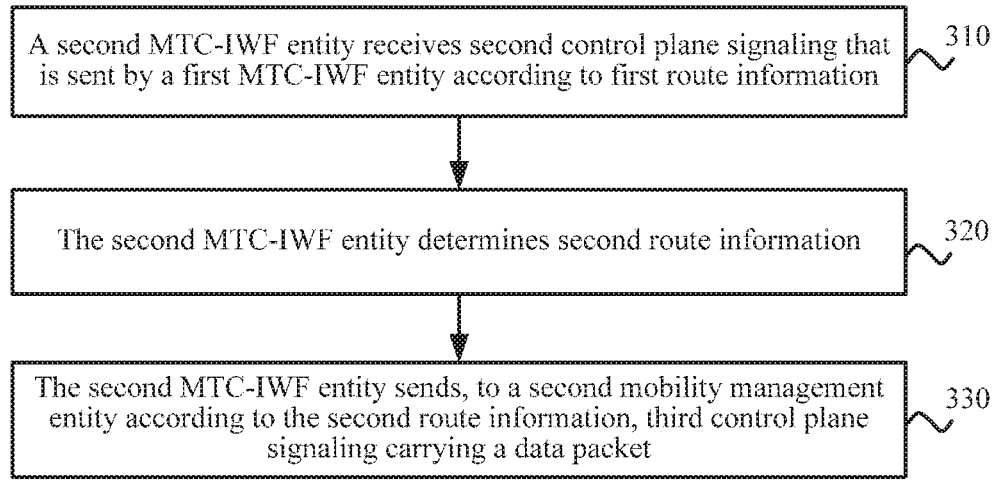
FIG. 3 is a schematic flowchart of a data transmission method according to another embodiment of the present invention.

FIG. 3 is a schematic flowchart of a data transmission method according to another embodiment of the present invention. The method in FIG. 3 is executed by an MTC-IWF entity that serves second UE.

310: A second MTC-IWF entity receives second control plane signaling that is sent by a first MTC-IWF entity according to first route information, where the second control plane signaling carries a data packet that is from first UE, a target receive end of the data packet is second UE, the first route information is used for indicating the second MTC-IWF entity, and the second MTC-IWF entity serves the second UE.

The second MTC-IWF entity may be in a home network of the second UE. The first route information may include an identifier of the second MTC-IWF entity or an IP address of the second MTC-IWF entity. The first MTC-IWF entity may acquire the first route information from a user subscription database entity.

320: The second MTC-IWF entity determines second route information, where the second route information is used for indicating a second mobility management entity that serves the second UE.

In order to send the data packet to the second UE, the second MTC-IWF entity needs to determine the second mobility management entity that serves the second UE, that is, needs to determine the second route information. For example, the second route information may include an identifier of the second mobility management entity or an IP address of the second mobility management entity.

330: The second MTC-IWF entity sends, to the second mobility management entity according to the second route information, third control plane signaling carrying the data packet, so that the second mobility management entity sends the data packet to the second UE.

For example, the second mobility management entity may send, to the second UE, a NAS message carrying the data packet.

In this embodiment of the present invention, a second MTC-IWF entity that serves second UE determines second route information used for indicating a second mobility management entity, and sends, to the second mobility management entity according to the second route information, third control plane signaling carrying a data packet that is from first UE, so that the second mobility management entity can send the data packet to the second UE, without requiring to establish a user plane bearer for the first UE and the second UE, thereby saving network resources.

Optionally, as an embodiment, in step 320, the second MTC-IWF entity may send a third request message to a user subscription database entity, where the third request message is used for requesting the second route information. The second MTC-IWF entity may receive the second route information that is sent by the user subscription database entity according to the third request message.

For example, the data packet may carry information about the second UE, for example, an identifier of the second UE or an IP address of the second UE. The third request message sent by the second MTC-IWF entity to the user subscription database entity may carry the identifier of the second UE. In this way, the user subscription database entity may send the second route information to the second MTC-IWF entity according to the identifier of the second UE.

Figure 4:
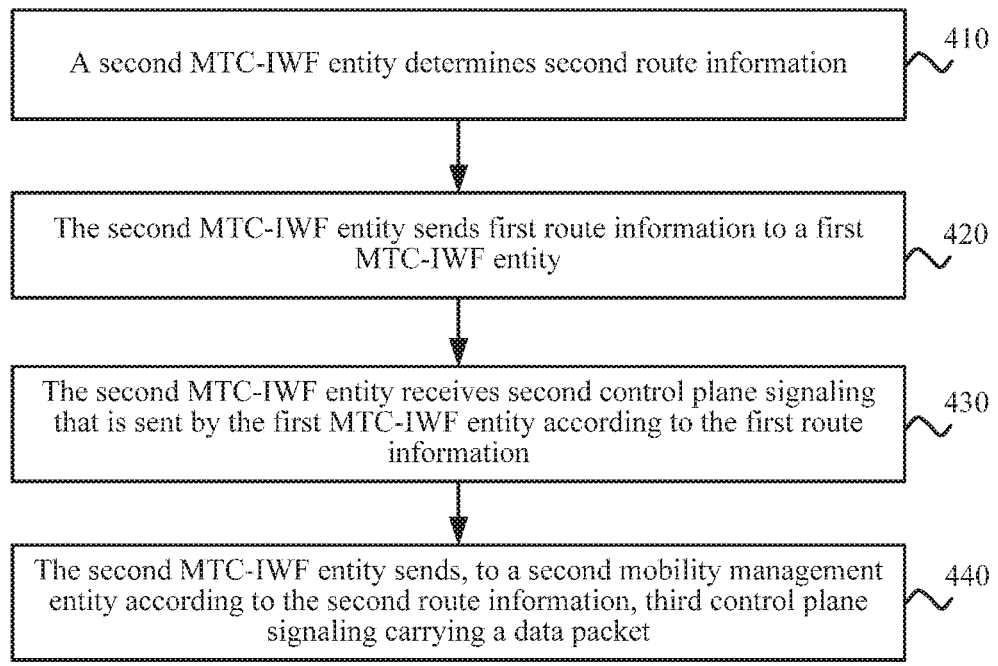
FIG. 4 is a schematic flowchart of a data transmission method according to another embodiment of the present invention.

FIG. 4 is a schematic flowchart of a data transmission method according to another embodiment of the present invention. The method in FIG. 4 is executed by an MTC-IWF entity that serves second UE.

410: A second MTC-IWF entity determines second route information, where the second route information is used for indicating a second mobility management entity, and the second MTC-IWF entity and the second mobility management entity both serve second UE.

The second MTC-IWF entity may be in a home network of the second UE. If the second UE is in the home network of the second UE, the second mobility management entity may be in the home network of the second UE. If the second UE is in a roaming network of the second UE, the second mobility management entity may be in the roaming network of the second UE. The second route information may include an identifier of the second mobility management entity or an IP address of the second mobility management entity.

420: The second MTC-IWF entity sends first route information to a first MTC-IWF entity, where the first route information is used for indicating the second MTC-IWF entity.

For example, the first route information may include an identifier of the second MTC-IWF entity or an IP address of the second MTC-IWF entity.

430: The second MTC-IWF entity receives second control plane signaling that is sent by the first MTC-IWF entity according to the first route information, where the second control plane signaling carries a data packet that is from first UE, and a target receive end of the data packet is the second UE.

The first MTC-IWF entity serves the first UE. After receiving the first route information, the first MTC-IWF entity may send, to the second MTC-IWF entity according to the first route information, the data packet that is from the first UE.

440: The second MTC-IWF entity sends, to the second mobility management entity according to the second route information, third control plane signaling carrying the data packet, so that the second mobility management entity sends the data packet to the second UE.

For example, the second mobility management entity may send, to the second UE, a NAS message carrying the data packet.

In this embodiment of the present invention, a second MTC-IWF entity that serves second UE sends, to a first MTC-IWF entity, first route information for indicating the second MTC-IWF entity, receives, second control plane signaling that is sent by the first MTC-IWF entity according to the first route information and that carries a data packet which is from first UE, and sends, to a second mobility management entity according to second route information, third control plane signaling carrying the data packet, so that the second mobility management entity can send the data packet to the second UE, without requiring to establish a user plane bearer for the first UE and the second UE, thereby saving network resources.

Optionally, as an embodiment, before step 410, the second MTC-IWF entity receives a first request message from a user subscription database entity, where the first request message is received by the user subscription database entity from the first MTC-IWF entity, and the first request message is used for requesting the first route information.

For example, the first request message may carry information about the second UE, and the user subscription database entity may forward the first request message to the second MTC-IWF entity according to the information about the second UE.

Optionally, as another embodiment, in step 410, the second MTC-IWF entity may send a third request message to the user subscription database entity according to the first request message, where the third request message is used for requesting the second route information. The second MTC-IWF entity receives the second route information that is sent by the user subscription database entity according to the third request message.

The user subscription database entity forwards the first request message to the second MTC-IWF entity; therefore, it may also be understood as that the first MTC-IWF entity sends the first request message to the second MTC-IWF entity. In this way, the second MTC-IWF entity may request the second route information from the user subscription database entity, so as to forward the data packet that is received from the first MTC-IWF entity.

Optionally, as another embodiment, in step 420, the second MTC-IWF entity may send the first route information to the first MTC-IWF entity according to the first request message.

Because the user subscription database entity forwards the first request message of the first MTC-IWF entity to the second MTC-IWF entity, the second MTC-IWF entity may acquire route information of the first MTC-IWF entity from the first request message, for example, an identifier of the first MTC-IWF entity or an IP address of the first MTC-IWF entity. The second MTC-IWF entity may send the first route information to the first MTC-IWF entity according to the identifier or the IP address of the first MTC-IWF entity.

Optionally, as another embodiment, before step 410, the second MTC-IWF entity may receive a second request message from a user subscription database entity, where the second request message is used for instructing to send the first route information to the first MTC-IWF entity, the second request message is sent by the user subscription database entity according to a first request message, the first request message is received by the user subscription database entity from the first MTC-IWF entity, and the first request message is used for requesting the first route information.

For example, the user subscription database entity may receive, from the first MTC-IWF entity, the first request message used for requesting the first route information, where the first request message may carry information about the second UE, for example, an identifier or an IP address of the second UE. The user subscription database entity may send the second request message to the second MTC-IWF entity according to the information about the second UE.

Optionally, as another embodiment, in step 410, the second MTC-IWF entity may acquire the second route information carried in the second request message.

Specifically, the second request message may further carry the second route information. In this way, the second MTC-IWF entity does not need to request the second route information from the user subscription database entity, so that signaling overheads can be reduced.

Optionally, as another embodiment, in step 420, the first MTC-IWF entity may send the first route information to the second MTC-IWF entity according to the second request message.

For example, the second request message may carry an identifier or an IP address of the first MTC-IWF entity. In this way, the second MTC-IWF entity may send the first route information to the first MTC-IWF entity according to the identifier or the IP address of the first MTC-IWF entity.

Figure 5:
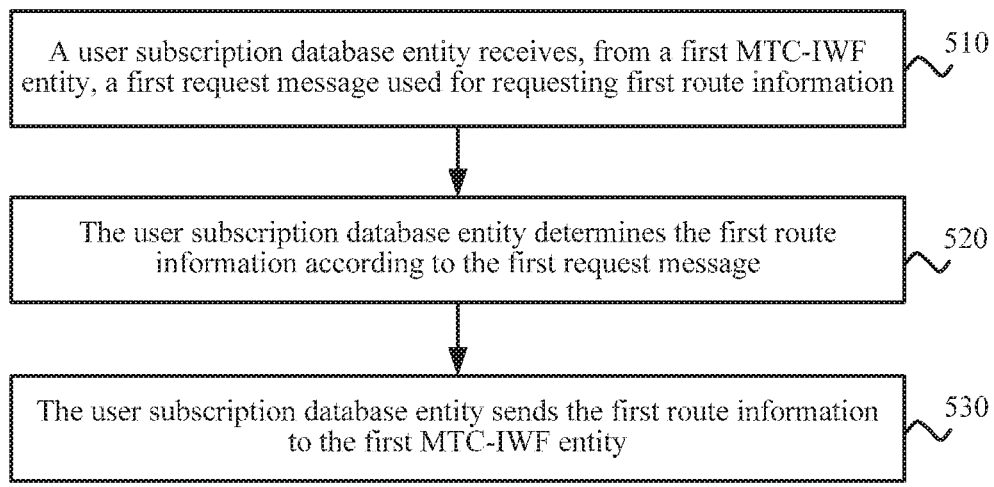
FIG. 5 is a schematic flowchart of a data transmission method according to another embodiment of the present invention.

FIG. 5 is a schematic flowchart of a data transmission method according to another embodiment of the present invention. The method in FIG. 5 is executed by a user subscription database entity, for example, an HSS or an HLR.

510: A user subscription database entity receives, from a first MTC-IWF entity, a first request message used for requesting first route information, where the first route information is used for indicating a second network side device that serves second UE, the first request message is sent by the first MTC-IWF entity after the first MTC-IWF entity receives first control plane signaling from a first mobility management entity, the first control plane signaling carries a data packet that is from first UE, and a target receive end of the data packet is the second UE.

The first MTC-IWF entity and the first mobility management entity both serve the first UE. The data packet may carry information about the first UE and information about the second UE, for example, an identifier of the first UE and an identifier of the second UE, or an IP address of the first UE and an IP address of the second UE. The first request message may carry the information about the second UE, for example, the identifier of the second UE or the IP address of the second UE.

520: The user subscription database entity determines the first route information according to the first request message.

For example, the user subscription database entity may search for the first route information according to the identifier of the second UE. The first route information may include an identifier of the second network side device or an IP address of the second network side device.

530: The user subscription database entity sends the first route information to the first MTC-IWF entity, so that the first MTC-IWF entity sends, to the second network side device according to the first route information, second control plane signaling carrying the data packet, and the second network side device sends the data packet to the second UE.

In this embodiment of the present invention, a user subscription database entity sends, to a first MTC-IWF entity, first route information used for indicating a second network side device that serves second UE, to enable the first MTC-IWF to send, to the second network side device according to the first route information, second control plane signaling carrying a data packet, so that the second network side device can send the data packet to the second UE, without requiring to establish a user plane bearer for first UE and the second UE, thereby saving network resources.

Optionally, as an embodiment, the first route information may be used for indicating a second mobility management entity that serves the second UE.

For example, if the second UE is in a home network of the second UE, the user subscription database entity may return route information of the second mobility management entity to the first MTC-IWF entity. The first route information may include an identifier of the second mobility management entity or an IP address of the second mobility management entity.

Optionally, as another embodiment, the first route information may be used for indicating a second MTC-IWF entity that serves the second UE.

For example, if the second UE is in a roaming network of the second UE, the user subscription database entity may return route information of the second MTC-IWF entity to the first MTC-IWF entity. The second MTC-IWF entity may be in a home network of the second UE. The first route information may include an identifier of the second MTC-IWF entity or an IP address of the second MTC-IWF entity.

Optionally, as another embodiment, in a case in which the first route information may be used for indicating the second MTC-IWF entity that serves the second UE, after step 530, the user subscription database entity may receive a third request message from the second MTC-IWF entity, where the third request message is used for requesting second route information, and the second route information is used for indicating a second mobility management entity that serves the second UE. The user subscription database entity may determine the second route information according to the third request message, and send the second route information to the second MTC-IWF entity.

For example, the first MTC-IWF entity may send, to the second MTC-IWF entity according to the first route information, the second control plane signaling carrying the data packet, and the second MTC-IWF entity may send, to the second mobility management entity according to the second route information, third control plane signaling carrying the data packet; the second mobility management entity sends the data packet to the second UE.

Figure 6:
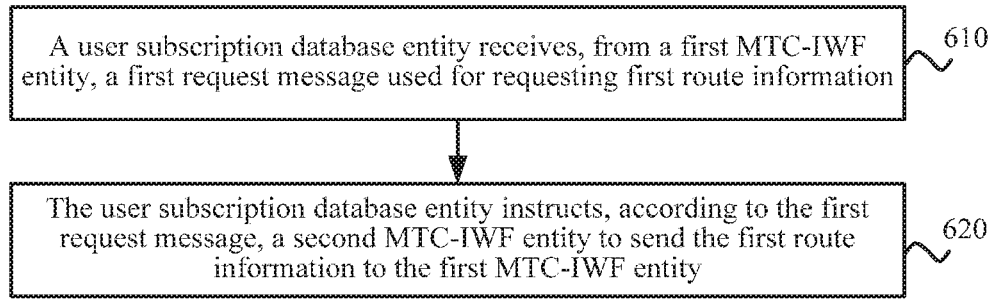
FIG. 6 is a schematic flowchart of a data transmission method according to another embodiment of the present invention.

FIG. 6 is a schematic flowchart of a data transmission method according to another embodiment of the present invention. The method in FIG. 6 is executed by a user subscription database entity, for example, an HSS or an HLR.

610: A user subscription database entity receives, from a first MTC-IWF entity, a first request message used for requesting first route information, where the first request message is sent by the first MTC-IWF entity after the first MTC-IWF entity receives first control plane signaling from a first mobility management entity, the first control plane signaling carries a data packet that is from first UE, and a target receive end of the data packet is second UE.

The first MTC-IWF entity and the first mobility management entity both serve the first UE. The data packet may carry information about the first UE and information about the second UE, for example, an identifier of the first UE and an identifier of the second UE, or an IP address of the first UE and an IP address of the second UE. The first request message may carry the information about the second UE, for example, the identifier of the second UE or the IP address of the second UE.

620: The user subscription database entity instructs, according to the first request message, a second MTC-IWF entity to send the first route information to the first MTC-IWF entity, where the first route information is used for indicating the second MTC-IWF entity, so that the first MTC-IWF entity sends, to the second MTC-IWF entity according to the first route information, second control plane signaling carrying the data packet, and the second MTC-IWF entity sends the data packet to the second UE.

Specifically, the user subscription database entity may notify the second MTC-IWF entity, and the second MTC-IWF entity sends the first route information to the first MTC-IWF entity. For example, the first route information may include an identifier of the second MTC-IWF entity or an IP address of the second MTC-IWF entity.

In this embodiment of the present invention, a user subscription database entity instructs a second MTC-IWF entity to send, to a first MTC-IWF entity, first route information used for indicating the second MTC-IWF entity, to enable the first MTC-IWF to send, to the second MTC-IWF entity according to the first route information, second control plane signaling carrying a data packet, so that the second MTC-IWF entity can send the data packet to second UE, without requiring to establish a user plane bearer for first UE and the second UE, thereby saving network resources.

Optionally, as an embodiment, in step 620, the user subscription database entity may forward the first request message to the second MTC-IWF entity.

For example, the first request message may carry information about the second UE, and the user subscription database entity may forward the first request message to the second MTC-IWF entity according to the information about the second UE.

Optionally, as another embodiment, after step 620, the user subscription database entity may receive a third request message that is sent by the second MTC-IWF entity according to the first request message, where the third request message is used for requesting second route information, and the second route information is used for indicating a second mobility management entity that serves the second UE. The user subscription database entity may send the second route information to the second MTC-IWF entity according to the third request message.

Specifically, after receiving the first request message, the second MTC-IWF entity may send the third request message to the user subscription database entity, to request the second route information. The second route information may include an identifier of the second mobility management entity or an IP address of the second mobility management entity.

The embodiments of the present invention are described in detail below with reference to specific examples. It should be noted that, these examples are merely intended to help a person skilled in the art to better understand the embodiments of the present invention rather than to limit the scope of the embodiments of the present invention. In the following examples, an LTE system is used as an example for description. In the LTE system, a mobility management entity is an MME, and a user subscription database entity is an HSS.

Figure 7:
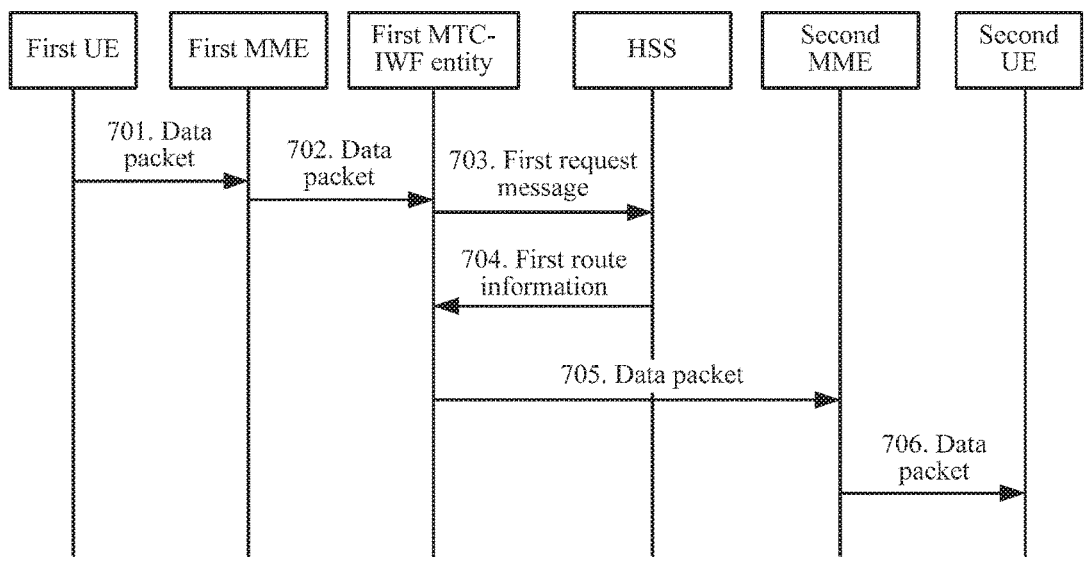
FIG. 7 is a schematic flowchart of a process of a data transmission method according to an embodiment of the present invention.

FIG. 7 is a schematic flowchart of a process of a data transmission method according to an embodiment of the present invention.

701: First UE sends, to a first MME, a NAS message carrying a data packet.

The data packet may be a data packet of a small data volume. The data packet may carry information about the first UE and information about second UE, for example, may carry an identifier of the first UE and an identifier of the second UE. That is, a target receive end of the data packet is the second UE.

702: The first MME sends first control plane signaling to a first MTC-IWF entity, where the first control plane signaling carries the data packet.

For example, the first MME may determine an IP address of the first MTC-IWF entity according to the identifier of the first UE that is carried in the data packet. Then, the first MME may send the first control plane signaling to the first MTC-IWF entity according to the IP address of the first MTC-IWF entity.

The first MTC-IWF entity may be in a home network of the first UE.

703: The first MTC-IWF entity sends a first request message to an HSS, where the first request message is used for requesting first route information.

The first route information may be route information of a second network side device that serves the second UE. In order to send the data packet to the second UE, the first MTC-IWF entity needs to request, from the HSS, the first route information of the second network side device that serves the second UE. The first request message may carry the identifier of the second UE.

704: The HSS sends the first route information to the first MTC-IWF entity, where the first route information is used for indicating a second MME that serves second UE.

If the second UE is in a non-roaming state, that is, in a home network of the second UE, the HSS may search, according to the identifier of the second UE, for route information of the second MME that serves the second UE, and then, may return the route information of the second MME to the first MTC-IWF entity. For example, the first route information may include an identifier of the second MME or an IP address of the second MME.

705: The first MTC-IWF entity sends second control plane signaling to the second MME according to second route information, where the second control plane signaling carries the data packet.

706: The second MME sends, to the second UE, a NAS message carrying the data packet.

In this embodiment of the present invention, a first MTC-IWF entity receives, from a first MME, first control plane signaling carrying a data packet of first UE, and sends, to a second MME according to first route information, second control plane signaling carrying the data packet, so that the second MME can send the data packet to second UE, without requiring to establish a user plane bearer for the first UE and the second UE, thereby saving network resources.

Figure 8:
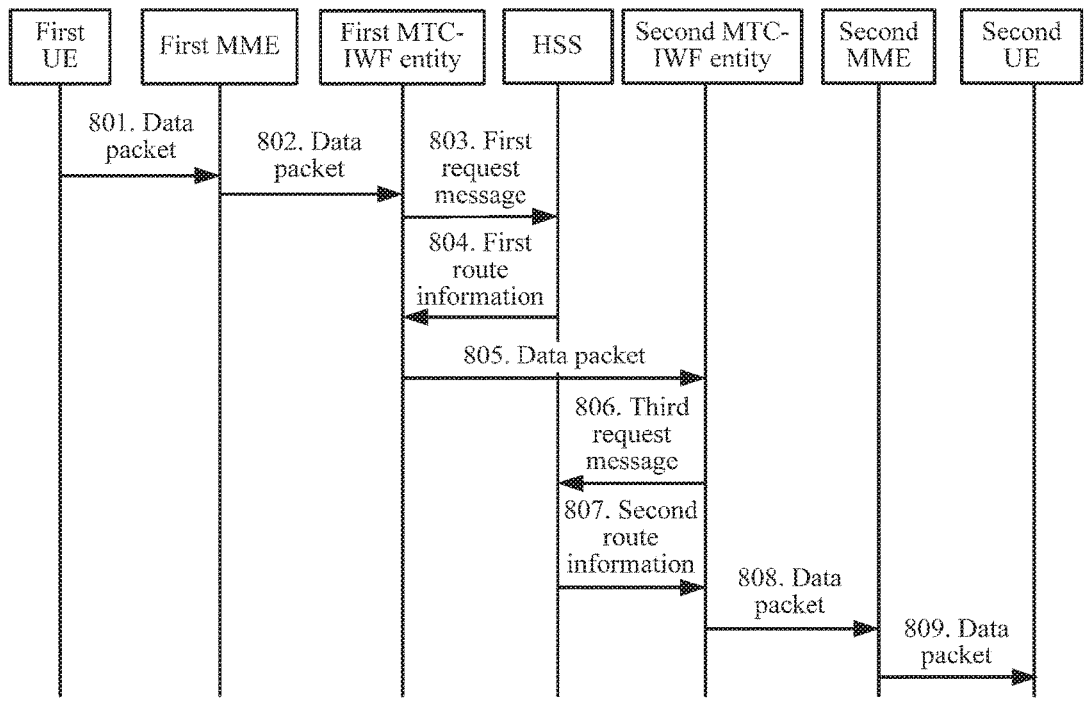
FIG. 8 is a schematic flowchart of a process of a data transmission method according to another embodiment of the present invention.

FIG. 8 is a schematic flowchart of a process of a data transmission method according to another embodiment of the present invention.

In FIG. 8, step 801 and step 802 are similar to step 701 and step 702 in FIG. 7, and details are not described again to avoid repetition.

803: The first MTC-IWF entity sends a first request message to an HSS, where the first request message is used for requesting first route information.

The first route information may be route information of a second network side device that serves second UE. In order to send the data packet to the second UE, the first MTC-IWF entity needs to request, from the HSS, the first route information of the second network side device that serves the second UE. The first request message may carry an identifier of the second UE.

804: The HSS sends the first route information to the first MTC-IWF entity, where the first route information is used for indicating a second MTC-IWF entity that serves second UE.

If the second UE is in a roaming state, that is, in a roaming network of the second UE, the HSS may search, according to the identifier of the second UE, for route information of the second MTC-IWF entity that serves the second UE, and then, may return the route information of the second MTC-IWF entity to the first MTC-IWF entity. For example, the first route information may include an identifier or an IP address of the second MTC-IWF entity.

The second MTC-IWF entity may be in a home network of the second UE.

805: The first MTC-IWF entity sends, to the second MTC-IWF entity according to the first route information, second control plane signaling carrying the data packet.

806: The second MTC-IWF entity sends a third request message to the HSS according to the second control plane signaling, where the third request message is used for requesting second route information.

The second route information may be used for indicating a second MME that serves the second UE.

807: The HSS sends the second route information to the second MTC-IWF entity.

For example, the third request message may carry the identifier of the second UE. The HSS may search for route information of the second MME according to the identifier of the second UE.

For example, the second route information may include an identifier of the second MME or an IP address of the second MME.

808: The second MTC-IWF entity sends, to second MME according to the second route information, third control plane signaling carrying the data packet.

809: The second MME sends, to the second UE, a NAS message carrying the data packet.

In this embodiment of the present invention, a first MTC-IWF entity receives, from a first MME, first control plane signaling carrying a data packet of first UE, and sends, to a second MTC-IWF entity according to first route information, second control plane signaling carrying the data packet, so that the second MTC-IWF entity can send the data packet to second UE by using a second MME, without requiring to establish a user plane bearer for the first UE and the second UE, thereby saving network resources.

Figure 9:
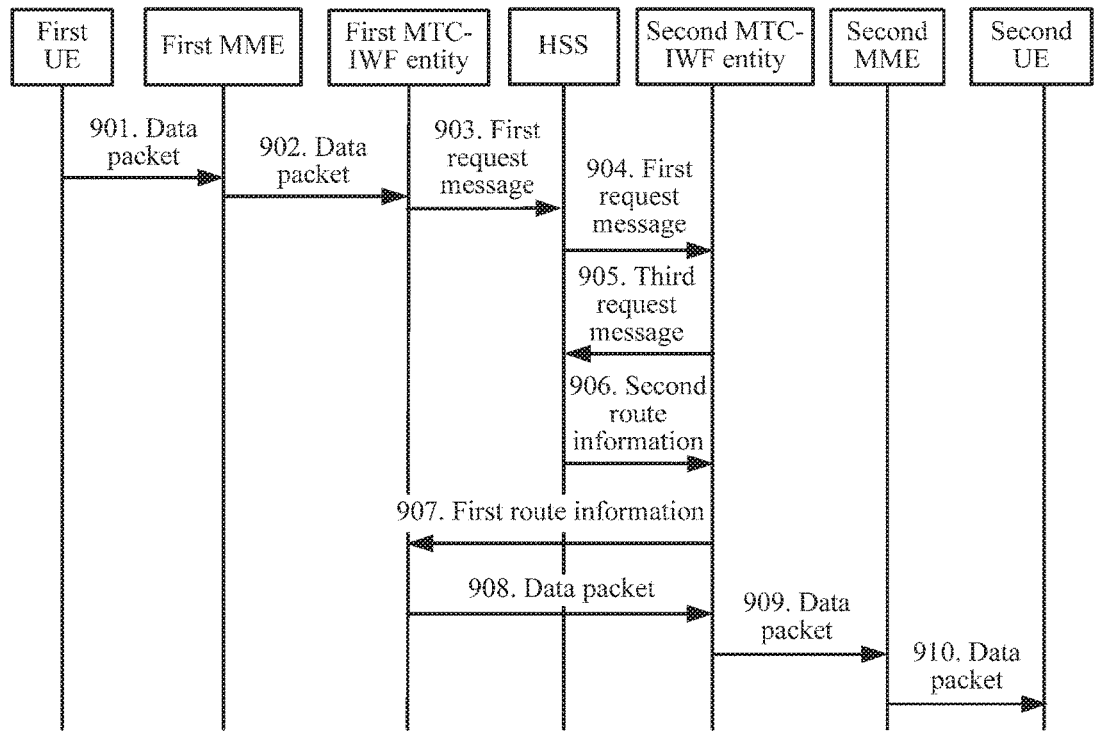
FIG. 9 is a schematic flowchart of a process of a data transmission method according to another embodiment of the present invention.

FIG. 9 is a schematic flowchart of a process of a data transmission method according to another embodiment of the present invention.

In FIG. 9, step 901 and step 902 are similar to step 701 and step 702 in FIG. 7, and details are not described again to avoid repetition.

903: The first MTC-IWF entity sends a first request message to an HSS, where the first request message is used for requesting first route information.

The first route information may be route information of a second network side device that serves second UE. In order to send the data packet to the second UE, the first MTC-IWF entity needs to request, from the HSS, the first route information of the second network side device that serves the second UE. The first request message may carry an identifier of the second UE.

904: The HSS forwards the first request message to a second MTC-IWF entity.

For example, when the second UE is located in a roaming network of the second UE, the HSS may determine an IP address of the second MTC-IWF entity according to the identifier of the second UE, and then forward the first request message to the second MTC-IWF entity according to the IP address of the second MTC-IWF entity.

905: The second MTC-IWF entity sends a third request message to the HSS according to the first request message, where the third request message is used for requesting second route information.

906: The HSS sends the second route information to the second MTC-IWF entity according to the third request message.

The second route information may be used for indicating a second MME that serves the second UE. For example, the second route information may include an identifier of the second MME or an IP address of the second MME.

907: The second MTC-IWF entity sends the first route information to the first MTC-IWF entity.

The first route information may be used for indicating the second MTC-IWF entity. For example, the first route information may include an identifier of the second MTC-IWF entity or the IP address of the second MTC-IWF entity.

908: The first MTC-IWF entity sends, to the second MTC-IWF entity according to the first route information, second control plane signaling carrying the data packet.

909: The second MTC-IWF entity sends, to a second MME according to the second route information, third control plane signaling carrying the data packet.

910: The second MME sends, to second UE, a NAS message carrying the data packet.

In this embodiment of the present invention, a first MTC-IWF entity receives, from a first MME, first control plane signaling carrying a data packet of first UE, and sends, to a second MTC-IWF entity according to first route information, second control plane signaling carrying the data packet, so that the second MTC-IWF entity can send the data packet to second UE by using a second MME, without requiring to establish a user plane bearer for the first UE and the second UE, thereby saving network resources.

Figure 10:
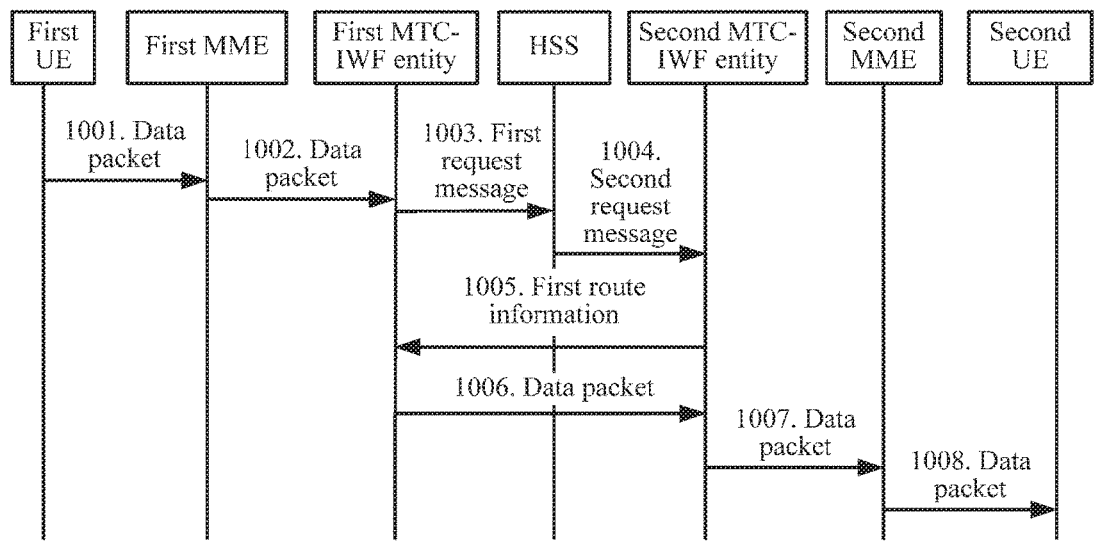
FIG. 10 is a schematic flowchart of a data transmission method according to another embodiment of the present invention.

FIG. 10 is a schematic flowchart of a data transmission method according to another embodiment of the present invention.

In FIG. 10, step 1001 and step 1002 are similar to step 701 and step 702 in FIG. 7, and details are not described herein again to avoid repetition.

1003: The first MTC-IWF entity sends a first request message to an HSS, where the first request message is used for requesting first route information.

The first route information may be route information of a second network side device that serves second UE. In order to send the data packet to the second UE, the first MTC-IWF entity needs to request, from the HSS, the first route information of the second network side device that serves the second UE. The first request message may carry an identifier of the second UE.

1004: The HSS sends a second request message to a second MTC-IWF entity according to the first request message.

The second request message is used for instructing to send the first route information to the first MTC-IWF entity. For example, when the second UE is in a roaming network of the second UE, the HSS may determine an IP address of the second MTC-IWF entity according to the identifier of the second UE, and then send the second request message to the second MTC-IWF entity according to the IP address of the second MTC-IWF entity.

The second request message may carry an identifier of the first MTC-IWF entity or an IP address of the first MTC-IWF entity, the second request message may further carry second route information, and the second route information may indicate a second MME that serves the second UE. For example, the second route information may include an identifier of the second MME or an IP address of the second MME.

1005: The second MTC-IWF entity sends the first route information to the first MTC-IWF entity according to the second request message.

The first route information may be used for indicating the second MTC-IWF entity. For example, the first route information may include an identifier of the second MTC-IWF entity or the IP address of the second MTC-IWF entity.

1006: The first MTC-IWF entity sends, to the second MTC-IWF entity according to the first route information, second control plane signaling carrying the data packet.

1007: The second MTC-IWF entity sends, to second MME according to the second route information, third control plane signaling carrying the data packet.

1008: The second MME sends, to second UE, a NAS message carrying the data packet.

In this embodiment of the present invention, a first MTC-IWF entity receives, from a first MME, first control plane signaling carrying a data packet of first UE, and sends, to a second MTC-IWF entity according to first route information, second control plane signaling carrying the data packet, so that the second MTC-IWF entity can send the data packet to second UE by using a second MME, without requiring to establish a user plane bearer for the first UE and the second UE, thereby saving network resources.

Figure 11:
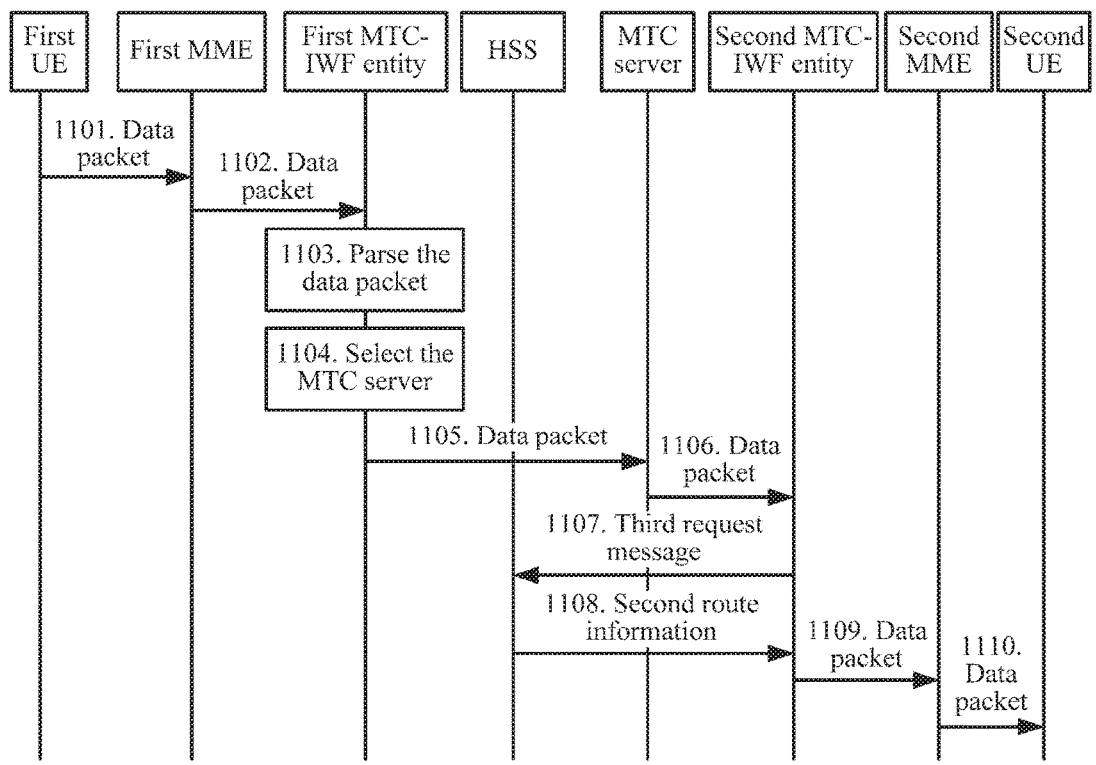
FIG. 11 is a schematic flowchart of a process of a data transmission method according to another embodiment of the present invention.

FIG. 11 is a schematic flowchart of a process of a data transmission method according to another embodiment of the present invention.

In FIG. 11, step 1101 and step 1102 are similar to step 701 and step 702 in FIG. 7, and details are not described herein again to avoid repetition.

1103: The first MTC-IWF entity parses the data packet, to acquire information about second UE or a service identifier that is carried in the data packet.

The information about the second UE may include an identifier of the second UE, an IP address of the second UE, or the like.

1104: The first MTC-IWF entity selects, according to the information about the second UE or the service identifier, an MTC server that serves the second UE, and determines first route information.

The first route information may indicate the MTC server, for example, may include an identifier of the MTC server or an IP address of the MTC server.

1105: The first MTC-IWF entity sends, to the MTC server, second control plane signaling carrying the data packet.

1106: The MTC server sends, to a second MTC-IWF entity that serves the second UE, fourth control plane signaling carrying the data packet.

1107: After receiving the data packet, the second MTC-IWF entity sends a third request message to an HSS, where the third request message is used for requesting second route information.

The second route information is used for indicating a second MME that serves the second UE. For example, the second route information may include an identifier of the second MME or an IP address of the second MME.

1108: The HSS sends the second route information to the second MTC-IWF entity according to the third request message.

1109: The second MTC-IWF entity sends, to a second MME according to the second route information, third control plane signaling carrying the data packet.

1110: The second MME sends, to the second UE, a NAS message carrying the data packet.

In this embodiment of the present invention, a first MTC-IWF entity determines first route information according to a data packet of first UE received from a first MME, and sends, to a second MTC-IWF entity according to the first route information, second control plane signaling carrying the data packet, so that the second MTC-IWF entity can send the data packet to second UE by using a second MME, without requiring to establish a user plane bearer for the first UE and the second UE, thereby saving network resources.

Figure 12:
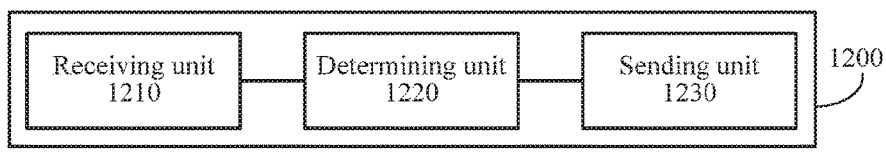
FIG. 12 is a schematic block diagram of an MTC-IWF entity according to an embodiment of the present invention.

FIG. 12 is a schematic block diagram of an MTC-IWF entity 1200 according to an embodiment of the present invention. The MTC-IWF entity 1200 in FIG. 12 includes: a receiving unit 1210, a determining unit 1220, and a sending unit 1230.

The receiving unit 1210 receives first control plane signaling from a first mobility management entity, where the first control plane signaling carries a data packet that is from first UE, and a target receive end of the data packet is second UE. The determining unit 1220 determines first route information, where the first route information is used for indicating a second network side device that serves the second UE. The sending unit 1230 sends, to the second network side device according to the first route information, second control plane signaling carrying the data packet, so that the second network side device sends the data packet to the second UE.

In this embodiment of the present invention, a first MTC-IWF entity receives, from a first mobility management entity, first control plane signaling carrying a data packet of first UE, and sends, to a second network side device according to first route information, second control plane signaling carrying the data packet, so that the second network side device can send the data packet to second UE, without requiring to establish a user plane bearer for the first UE and the second UE, thereby saving network resources.

Optionally, as an embodiment, the determining unit 1220 may send, to a user subscription database entity by using the sending unit 1230, a first request message used for requesting the first route information; and receive, by using the receiving unit 1210, the first route information that is determined by the user subscription database entity according to the first request message.

Optionally, as another embodiment, the first route information may be used for indicating a second mobility management entity that serves the second UE. The sending unit 1230 may send the second control plane signaling to the second mobility management entity according to the first route information, so that the second mobility management entity sends the data packet to the second UE.

Optionally, as another embodiment, the first route information may be used for indicating a second MTC-IWF entity that serves the second UE. The sending unit 1230 may send the second control plane signaling to the second MTC-IWF entity according to the first route information, so that the second MTC-IWF entity sends the data packet to the second UE by using a second mobility management entity, where the second mobility management entity serves the second UE.

Optionally, as another embodiment, the determining unit 1220 may send, to a user subscription database entity by using the sending unit 1230, a first request message used for requesting the first route information; and may receive, by using the receiving unit 1210, the first route information that is sent according to the first request message by a second MTC-IWF entity that serves the second UE, where the first request message is forwarded by the user subscription database entity to the second MTC-IWF entity, and the first route information is used for indicating the second MTC-IWF entity.

Optionally, as another embodiment, the determining unit 1220 may send, to a user subscription database entity by using the sending unit 1230, a first request message used for requesting the first route information; and may receive, by using the receiving unit 1210, the first route information that is sent according to a second request message by a second MTC-IWF entity that serves the second UE, where the first route information is used for indicating the second MTC-IWF entity, the second request message is used for instructing to send the first route information to the MTC-IWF entity 1200, and the second request message is sent by the user subscription database entity to the second MTC-IWF entity according to the first request message.

Optionally, as another embodiment, the sending unit 1230 may send the second control plane signaling to the second MTC-IWF entity according to the first route information, so that the second MTC-IWF entity sends the data packet to the second UE by using a second mobility management entity, where the second mobility management entity serves the second UE.

Optionally, as another embodiment, the determining unit 1220 may parse the data packet, to acquire information about the second UE or a service identifier, and may determine the first route information according to the information about the second UE or the service identifier, where the first route information is used for indicating an MTC server that serves the second UE.

Optionally, as another embodiment, the sending unit 1230 may send the second control plane signaling to the MTC server according to the first route information, so that the MTC server sends the data packet to the second UE by using a second MTC-IWF entity, where the second MTC-IWF entity serves the second UE.

For other functions and operations of the MTC-IWF entity 1200, reference may be made to the processes involving the first MTC-IWF entity in the foregoing method embodiments in FIG. 2 to FIG. 11, and details are not described herein again to avoid repetition.

Figure 13:
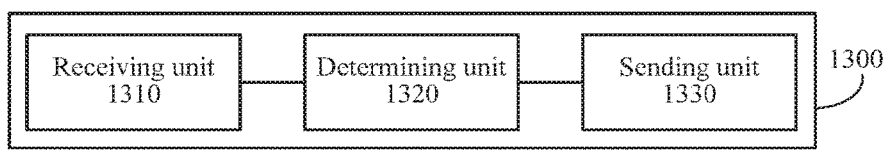
FIG. 13 is a schematic block diagram of an MTC-IWF entity according to another embodiment of the present invention.

FIG. 13 is a schematic block diagram of an MTC-IWF entity according to another embodiment of the present invention. The MTC-IWF entity 1300 in FIG. 13 includes: a receiving unit 1310, a determining unit 1320, and a sending unit 1330.

The receiving unit 1310 receives second control plane signaling that is sent by a first MTC-IWF entity according to first route information, where the second control plane signaling carries a data packet that is from first UE, a target receive end of the data packet is second UE, the first route information is used for indicating the second MTC-IWF entity, and the second MTC-IWF entity serves the second UE. The determining unit 1320 determines second route information, where the second route information is used for indicating a second mobility management entity that serves the second UE. The sending unit 1330 sends, to the second mobility management entity according to the second route information, third control plane signaling carrying the data packet, so that the second mobility management entity sends the data packet to the second UE.

In this embodiment of the present invention, a second MTC-IWF entity that serves second UE determines second route information used for indicating a second mobility management entity, and sends, to the second mobility management entity according to the second route information, third control plane signaling carrying a data packet that is from first UE, so that the second mobility management entity can send the data packet to the second UE, without requiring to establish a user plane bearer for the first UE and the second UE, thereby saving network resources.

Optionally, as an embodiment, the determining unit 1320 may send a third request message to a user subscription database entity by using the sending unit 1330, where the third request message is used for requesting the second route information; and may receive, by using the receiving unit 1310, the second route information that is sent by the user subscription database entity according to the third request message.

For other functions and operations of the MTC-IWF entity 1300, reference may be made to the processes involving the second MTC-IWF entity in the foregoing method embodiments in FIG. 3, FIG. 5, FIG. 8, and FIG. 11, and details are not described herein again to avoid repetition.

Figure 14:
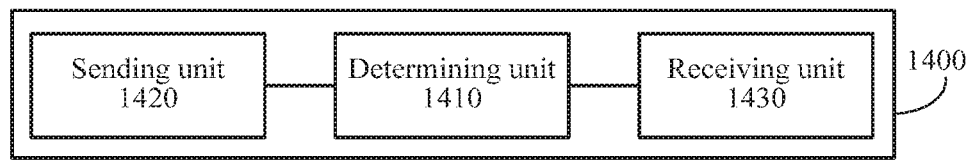
FIG. 14 is a schematic block diagram of an MTC-IWF entity according to another embodiment of the present invention.

FIG. 14 is a schematic block diagram of an MTC-IWF entity according to another embodiment of the present invention. The MTC-IWF entity 1400 in FIG. 14 includes: a determining unit 1410, a sending unit 1420, and a receiving unit 1430.

The determining unit 1410 determines second route information, where the second route information is used for indicating a second mobility management entity, and the second MTC-IWF entity and the second mobility management entity both serve second UE. The sending unit 1420 sends first route information to a first MTC-IWF entity, where the first route information is used for indicating the second MTC-IWF entity. The receiving unit 1430 receives second control plane signaling that is sent by the first MTC-IWF entity according to the first route information, where the second control plane signaling carries a data packet that is from first UE, and a target receive end of the data packet is the second UE. The sending unit 1420 further sends, to the second mobility management entity according to the second route information, third control plane signaling carrying the data packet, so that the second mobility management entity sends the data packet to the second UE.

In this embodiment of the present invention, a second MTC-IWF entity that serves second UE sends, to a first MTC-IWF entity, first route information for indicating the second MTC-IWF entity, receives, second control plane signaling that is sent by the first MTC-IWF entity according to the first route information and that carries a data packet which is from first UE, and sends, to a second mobility management entity according to second route information, third control plane signaling carrying the data packet, so that the second mobility management entity can send the data packet to the second UE, without requiring to establish a user plane bearer for the first UE and the second UE, thereby saving network resources.

Optionally, as an embodiment, before the determining unit 1410 determines the second route information, the receiving unit 1430 may further receive a first request message from a user subscription database entity, where the first request message is received by the user subscription database entity from the first MTC-IWF entity, and the first request message is used for requesting the first route information.

Optionally, as another embodiment, the sending unit 1420 may send the first route information to the first MTC-IWF entity according to the first request message.

Optionally, as another embodiment, the determining unit 1410 may send, by using the sending unit 1420, a third request message to the user subscription database entity according to the first request message, where the third request message is used for requesting the second route information. The determining unit 1410 may receive, by using the receiving unit 1430, the second route information that is sent by the user subscription database entity according to the third request message.

Optionally, as another embodiment, before the determining unit 1410 determines the second route information, the receiving unit 1430 may further receive a second request message from a user subscription database entity, where the second request message is used for instructing to send the first route information to the first MTC-IWF entity, the second request message is sent by the user subscription database entity according to a first request message, the first request message is received by the user subscription database entity from the first MTC-IWF entity, and the first request message is used for requesting the first route information.

Optionally, as another embodiment, the sending unit 1420 may send the first route information to the first MTC-IWF entity according to the second request message.

Optionally, as another embodiment, the determining unit 1410 may acquire the second route information carried in the second request message.

For other functions and operations of the MTC-IWF entity 1400, reference may be made to the processes involving the second MTC-IWF entity in the foregoing method embodiments in FIG. 4, FIG. 6, FIG. 9, and FIG. 10, and details are not described herein again to avoid repetition.

Figure 15:
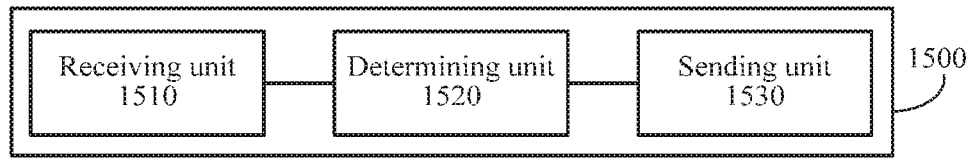
FIG. 15 is a schematic block diagram of a user subscription database entity according to an embodiment of the present invention.

FIG. 15 is a schematic block diagram of a user subscription database entity according to an embodiment of the present invention. The user subscription database entity 1500 in FIG. 15 is, for example, an HSS or an HLR. The user subscription database entity 1500 includes: a receiving unit 1510, a determining unit 1520, and a sending unit 1530.

The receiving unit 1510 receives, from a first MTC-IWF entity, a first request message used for requesting first route information, where the first route information is used for indicating a second network side device that serves second UE, the first request message is sent by the first MTC-IWF entity after the first MTC-IWF entity receives first control plane signaling from a first mobility management entity, the first control plane signaling carries a data packet that is from first UE, and a target receive end of the data packet is the second UE. The determining unit 1520 determines the first route information according to the first request message. The sending unit 1530 sends the first route information to the first MTC-IWF entity, so that the first MTC-IWF entity sends, to the second network side device according to the first route information, second control plane signaling carrying the data packet, and the second network side device sends the data packet to the second UE.

In this embodiment of the present invention, a user subscription database entity sends, to a first MTC-IWF entity, first route information used for indicating a second network side device that serves second UE, to enable the first MTC-IWF to send, to the second network side device according to the first route information, second control plane signaling carrying a data packet, so that the second network side device can send the data packet to the second UE, without requiring to establish a user plane bearer for first UE and the second UE, thereby saving network resources.

Optionally, as an embodiment, the first route information may be used for indicating a second mobility management entity that serves the second UE.

Optionally, as another embodiment, the first route information may be used for indicating a second MTC-IWF entity that serves the second UE.

Optionally, as another embodiment, the receiving unit 1510 may further receive a third request message from the second MTC-IWF entity, where the third request message is used for requesting second route information, and the second route information is used for indicating a second mobility management entity that serves the second UE. The determining unit 1520 may determine the second route information according to the third request message. The sending unit 1530 may further send the second route information to the second MTC-IWF entity.

For other functions and operations of the user subscription database entity 1500, reference may be made to the processes involving the user subscription database entity in the foregoing method embodiments in FIG. 2, FIG. 3, FIG. 5, FIG. 7, FIG. 8, and FIG. 11, and details are not described herein again to avoid repetition.

Figure 16:
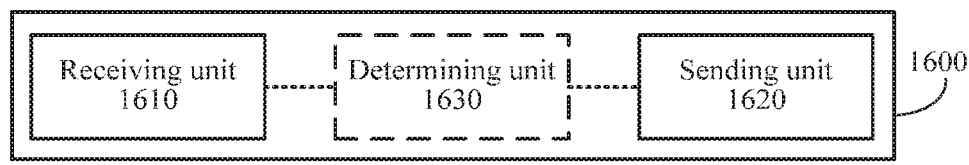
FIG. 16 is a schematic block diagram of a user subscription database entity according to another embodiment of the present invention.

FIG. 16 is a schematic block diagram of a user subscription database entity according to another embodiment of the present invention. The user subscription database entity 1600 in FIG. 16 is, for example, an HSS or an HLR. The user subscription database entity 1600 includes: a receiving unit 1610 and a sending unit 1620.

The receiving unit 1610 receives, from a first MTC-IWF entity, a first request message used for requesting first route information, where the first request message is sent by the first MTC-IWF entity after the first MTC-IWF entity receives first control plane signaling from a first mobility management entity, the first control plane signaling carries a data packet that is from first UE, and a target receive end of the data packet is second UE. The sending unit 1620 instructs a second MTC-IWF entity to send the first route information to the first MTC-IWF entity, where the first route information is used for indicating the second MTC-IWF entity, so that the first MTC-IWF entity sends, to the second MTC-IWF entity according to the first route information, second control plane signaling carrying the data packet, and the second MTC-IWF entity sends the data packet to the second UE.

In this embodiment of the present invention, a user subscription database entity instructs a second MTC-IWF entity to send, to a first MTC-IWF entity, first route information used for indicating the second MTC-IWF entity, to enable the first MTC-IWF to send, to the second MTC-IWF entity according to the first route information, second control plane signaling carrying a data packet, so that the second MTC-IWF entity can send the data packet to second UE, without requiring to establish a user plane bearer for first UE and the second UE, thereby saving network resources.

Optionally, as an embodiment, the sending unit 1620 may forward the first request message to the second MTC-IWF entity.

Optionally, as another embodiment, the user subscription database entity 1600 may further include a determining unit 1630. The receiving unit 1610 may further receive a third request message that is sent by the second MTC-IWF entity according to the first request message, where the third request message is used for requesting second route information, and the second route information is used for indicating a second mobility management entity that serves the second UE. The determining unit 1630 may determine the second route information according to the third request message. The sending unit 1620 may further send the second route information to the second MTC-IWF entity.

Optionally, as another embodiment, the sending unit 1620 may send a second request message to the second MTC-IWF entity according to the first request message, where the second request message is used for instructing to send the first route information to the first MTC-IWF entity.

Optionally, as another embodiment, the second request message may further carry second route information, and the second route information is used for indicating a second mobility management entity that serves the second UE.

For other functions and operations of the user subscription database entity 1600, reference may be made to the processes involving the user subscription database entity in the foregoing method embodiments in FIG. 2, FIG. 4, FIG. 6, FIG. 9, and FIG. 10, and details are not described herein again to avoid repetition.

Figure 17:
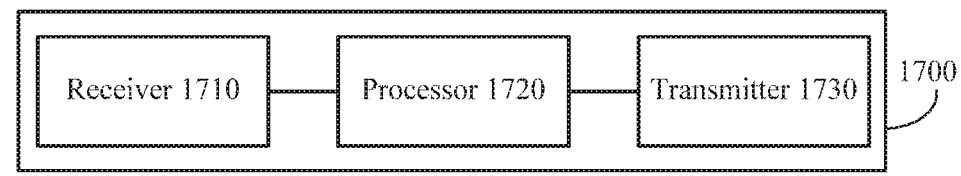
FIG. 17 is a schematic block diagram of an MTC-IWF entity according to an embodiment of the present invention.

FIG. 17 is a schematic block diagram of an MTC-IWF entity according to an embodiment of the present invention. The MTC-IWF entity 1700 in FIG. 17 includes: a receiver 1710, a processor 1720, and a transmitter 1730.

The receiver 1710 receives first control plane signaling from a first mobility management entity, where the first control plane signaling carries a data packet that is from first UE, and a target receive end of the data packet is second UE. The processor 1720 determines first route information, where the first route information is used for indicating a second network side device that serves the second UE. The transmitter 1730 sends, to the second network side device according to the first route information, second control plane signaling carrying the data packet, so that the second network side device sends the data packet to the second UE.

In this embodiment of the present invention, a first MTC-IWF entity receives, from a first mobility management entity, first control plane signaling carrying a data packet of first UE, and sends, to a second network side device according to first route information, second control plane signaling carrying the data packet, so that the second network side device can send the data packet to second UE, without requiring to establish a user plane bearer for the first UE and the second UE, thereby saving network resources.

Optionally, as an embodiment, the processor 1720 may send, to a user subscription database entity by using the transmitter 1730, a first request message used for requesting the first route information; and receive, by using the receiver 1710, the first route information that is determined by the user subscription database entity according to the first request message.

Optionally, as another embodiment, the first route information may be used for indicating a second mobility management entity that serves the second UE. The transmitter 1730 may send the second control plane signaling to the second mobility management entity according to the first route information, so that the second mobility management entity sends the data packet to the second UE.

Optionally, as another embodiment, the first route information may be used for indicating a second MTC-IWF entity that serves the second UE. The transmitter 1730 may send the second control plane signaling to the second MTC-IWF entity according to the first route information, so that the second MTC-IWF entity sends the data packet to the second UE by using a second mobility management entity, where the second mobility management entity serves the second UE.

Optionally, as another embodiment, the processor 1720 may send, to a user subscription database entity by using the transmitter 1730, a first request message used for requesting the first route information; and may receive, by using the receiver 1710, the first route information that is sent according to the first request message by a second MTC-IWF entity that serves the second UE, where the first request message is forwarded by the user subscription database entity to the second MTC-IWF entity, and the first route information is used for indicating the second MTC-IWF entity.

Optionally, as another embodiment, the processor 1720 may send, to a user subscription database entity by using the transmitter 1730, a first request message used for requesting the first route information; and may receive, by using the receiver 1710, the first route information that is sent according to a second request message by a second MTC-IWF entity that serves the second UE, where the first route information is used for indicating the second MTC-IWF entity, the second request message is used for instructing to send the first route information to the MTC-IWF entity 1700, and the second request message is sent by the user subscription database entity to the second MTC-IWF entity according to the first request message.

Optionally, as another embodiment, the transmitter 1730 may send the second control plane signaling to the second MTC-IWF entity according to the first route information, so that the second MTC-IWF entity sends the data packet to the second UE by using a second mobility management entity, where the second mobility management entity serves the second UE.

Optionally, as another embodiment, the processor 1720 may parse the data packet, to acquire information about the second UE or a service identifier, and may determine the first route information according to the information about the second UE or the service identifier, where the first route information is used for indicating an MTC server that serves the second UE.

Optionally, as another embodiment, the transmitter 1730 may send the second control plane signaling to the MTC server according to the first route information, so that the MTC server sends the data packet to the second UE by using a second MTC-IWF entity, where the second MTC-IWF entity serves the second UE.

For other functions and operations of the MTC-IWF entity 1700, reference may be made to the processes involving the first MTC-IWF entity in the foregoing method embodiments in FIG. 2 to FIG. 11, and details are not described herein again to avoid repetition.

Figure 18:
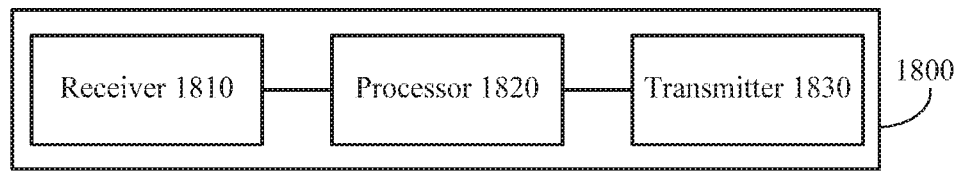
FIG. 18 is a schematic block diagram of an MTC-IWF entity according to another embodiment of the present invention.

FIG. 18 is a schematic block diagram of an MTC-IWF entity according to another embodiment of the present invention. The MTC-IWF entity 1800 in FIG. 18 includes: a receiver 1810, a processor 1820, and a transmitter 1830.

The receiver 1810 receives second control plane signaling that is sent by a first MTC-IWF entity according to first route information, where the second control plane signaling carries a data packet that is from first UE, a target receive end of the data packet is second UE, the first route information is used for indicating the second MTC-IWF entity, and the second MTC-IWF entity serves the second UE. The determining unit 1320 determines second route information, where the second route information is used for indicating a second mobility management entity that serves the second UE. The sending unit 1330 sends, to the second mobility management entity according to the second route information, third control plane signaling carrying the data packet, so that the second mobility management entity sends the data packet to the second UE.

In this embodiment of the present invention, a second MTC-IWF entity that serves second UE determines second route information used for indicating a second mobility management entity, and sends, to the second mobility management entity according to the second route information, third control plane signaling carrying a data packet that is from first UE, so that the second mobility management entity can send the data packet to the second UE, without requiring to establish a user plane bearer for the first UE and the second UE, thereby saving network resources.

Optionally, as an embodiment, the processor 1820 may send a third request message to a user subscription database entity by using the transmitter 1830, where the third request message is used for requesting the second route information, and may receive, by using the receiver 1810, the second route information that is sent by the user subscription database entity according to the third request message.

For other functions and operations of the MTC-IWF entity 1800, reference may be made to the processes involving the second MTC-IWF entity in the foregoing method embodiments in FIG. 3, FIG. 5, FIG. 8, and FIG. 11, and details are not described herein again to avoid repetition.

Figure 19:
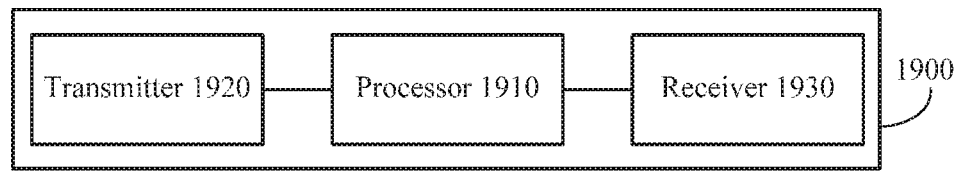
FIG. 19 is a schematic block diagram of an MTC-IWF entity according to another embodiment of the present invention.

FIG. 19 is a schematic block diagram of an MTC-IWF entity according to another embodiment of the present invention. The MTC-IWF entity 1900 in FIG. 19 includes: a processor 1910, a transmitter 1920, and a receiver 1930.

The processor 1910 determines second route information, where the second route information is used for indicating a second mobility management entity, and the second MTC-IWF entity and the second mobility management entity both serve second UE. The transmitter 1920 sends first route information to a first MTC-IWF entity, where the first route information is used for indicating the second MTC-IWF entity. The receiver 1930 receives second control plane signaling that is sent by the first MTC-IWF entity according to the first route information, where the second control plane signaling carries a data packet that is from first UE, and a target receive end of the data packet is the second UE. The transmitter 1920 further sends, to the second mobility management entity according to the second route information, third control plane signaling carrying the data packet, so that the second mobility management entity sends the data packet to the second UE.

In this embodiment of the present invention, a second MTC-IWF entity that serves second UE sends, to a first MTC-IWF entity, first route information for indicating the second MTC-IWF entity, receives, second control plane signaling that is sent by the first MTC-IWF entity according to the first route information and that carries a data packet which is from first UE, and sends, to a second mobility management entity according to second route information, third control plane signaling carrying the data packet, so that the second mobility management entity can send the data packet to the second UE, without requiring to establish a user plane bearer for the first UE and the second UE, thereby saving network resources.

Optionally, as an embodiment, before the processor 1910 determines the second route information, the receiver 1930 may further receive a first request message from a user subscription database entity, where the first request message is received by the user subscription database entity from the first MTC-IWF entity, and the first request message is used for requesting the first route information.

Optionally, as another embodiment, the transmitter 1920 may send the first route information to the first MTC-IWF entity according to the first request message.

Optionally, as another embodiment, the processor 1910 may send, by using the transmitter 1920, a third request message to the user subscription database entity according to the first request message, where the third request message is used for requesting the second route information. The processor 1910 may receive, by using the receiver 1930, the second route information that is sent by the user subscription database entity according to the third request message.

Optionally, as another embodiment, before the processor 1910 determines the second route information, the receiver 1930 may further receive a second request message from a user subscription database entity, where the second request message is used for instructing to send the first route information to the first MTC-IWF entity, the second request message is sent by the user subscription database entity according to a first request message, the first request message is received by the user subscription database entity from the first MTC-IWF entity, and the first request message is used for requesting the first route information.

Optionally, as another embodiment, the transmitter 1920 may send the first route information to the first MTC-IWF entity according to the second request message.

Optionally, as another embodiment, the processor 1910 may acquire the second route information carried in the second request message.

For other functions and operations of the MTC-IWF entity 1900, reference may be made to the processes involving the second MTC-IWF entity in the foregoing method embodiments in FIG. 4, FIG. 6, FIG. 9, and FIG. 10, and details are not described herein again to avoid repetition.

Figure 20:
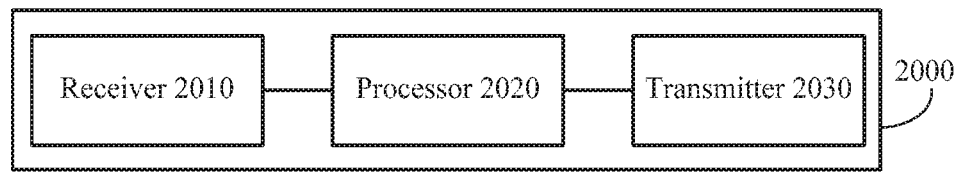
FIG. 20 is a schematic block diagram of a user subscription database entity according to an embodiment of the present invention.

FIG. 20 is a schematic block diagram of a user subscription database entity according to an embodiment of the present invention. The user subscription database entity 2000 in FIG. 20 is, for example, an HSS or an HLR. The user subscription database entity 2000 includes: a receiver 2010, a processor 2020, and a transmitter 2030.

The receiver 2010 receives, from a first MTC-IWF entity, a first request message used for requesting first route information, where the first route information is used for indicating a second network side device that serves second UE, the first request message is sent by the first MTC-IWF entity after the first MTC-IWF entity receives first control plane signaling from a first mobility management entity, the first control plane signaling carries a data packet that is from first UE, and a target receive end of the data packet is the second UE. The processor 2020 determines the first route information according to the first request message. The transmitter 2030 sends the first route information to the first MTC-IWF entity, so that the first MTC-IWF entity sends, to the second network side device according to the first route information, second control plane signaling carrying the data packet, and the second network side device sends the data packet to the second UE.

In this embodiment of the present invention, a user subscription database entity sends, to a first MTC-IWF entity, first route information used for indicating a second network side device that serves second UE, to enable the first MTC-IWF to send, to the second network side device according to the first route information, second control plane signaling carrying a data packet, so that the second network side device can send the data packet to the second UE, without requiring to establish a user plane bearer for first UE and the second UE, thereby saving network resources.

Optionally, as an embodiment, the first route information may be used for indicating a second mobility management entity that serves the second UE.

Optionally, as another embodiment, the first route information may be used for indicating a second MTC-IWF entity that serves the second UE.

Optionally, as another embodiment, the receiver 2010 may further receive a third request message from the second MTC-IWF entity, where the third request message is used for requesting second route information, and the second route information is used for indicating a second mobility management entity that serves the second UE. The processor 2020 may determine the second route information according to the third request message. The sending unit 1530 may further send the second route information to the second MTC-IWF entity.

For other functions and operations of the user subscription database entity 2000, reference may be made to the processes involving the user subscription database entity in the foregoing method embodiments in FIG. 2, FIG. 3, FIG. 5, FIG. 7, FIG. 8, and FIG. 11, and details are not described herein again to avoid repetition.

Figure 21:
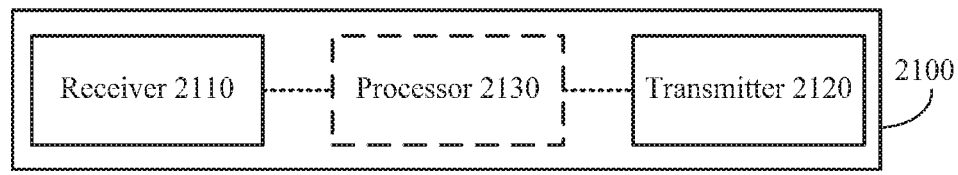
FIG. 21 is a schematic block diagram of a user subscription database entity according to another embodiment of the present invention.

FIG. 21 is a schematic block diagram of a user subscription database entity according to another embodiment of the present invention. The user subscription database entity 2100 in FIG. 21 is, for example, an HSS or an HLR. The user subscription database entity 2100 includes: a receiver 2110 and a transmitter 2120.

The receiver 2110 receives, from a first MTC-IWF entity, a first request message used for requesting first route information, where the first request message is sent by the first MTC-IWF entity after the first MTC-IWF entity receives first control plane signaling from a first mobility management entity, the first control plane signaling carries a data packet that is from first UE, and a target receive end of the data packet is second UE. The transmitter 2120 instructs a second MTC-IWF entity to send the first route information to the first MTC-IWF entity, where the first route information is used for indicating the second MTC-IWF entity, so that the first MTC-IWF entity sends, to the second MTC-IWF entity according to the first route information, second control plane signaling carrying the data packet, and the second MTC-IWF entity sends the data packet to the second UE.

In this embodiment of the present invention, a user subscription database entity instructs a second MTC-IWF entity to send, to a first MTC-IWF entity, first route information used for indicating the second MTC-IWF entity, to enable the first MTC-IWF to send, to the second MTC-IWF entity according to the first route information, second control plane signaling carrying a data packet, so that the second MTC-IWF entity can send the data packet to second UE, without requiring to establish a user plane bearer for first UE and the second UE, thereby saving network resources.

Optionally, as an embodiment, the transmitter 2120 may forward the first request message to the second MTC-IWF entity.

Optionally, as another embodiment, the user subscription database entity 2100 may further include a processor 2130. The receiver 2110 may further receive a third request message that is sent by the second MTC-IWF entity according to the first request message, where the third request message is used for requesting second route information, and the second route information is used for indicating a second mobility management entity that serves the second UE. The processor 2130 may determine the second route information according to the third request message. The transmitter 2120 may further send the second route information to the second MTC-IWF entity.

Optionally, as another embodiment, the transmitter 2120 may send a second request message to the second MTC-IWF entity according to the first request message, where the second request message is used for instructing to send the first route information to the first MTC-IWF entity.

Optionally, as another embodiment, the second request message may further carry second route information, and the second route information is used for indicating a second mobility management entity that serves the second UE.

For other functions and operations of the user subscription database entity 2100, reference may be made to the processes involving the user subscription database entity in the foregoing method embodiments in FIG. 2, FIG. 4, FIG. 6, FIG. 9, and FIG. 10, and details are not described herein again to avoid repetition.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first machine type communication-interworking function (MTC-IWF) entity comprising:
　a processor;
　a transmitter; and
　a receiver, wherein the processor is electrically coupled to the transmitter and the receiver,
　wherein the receiver is configured to receive first control plane signaling from a first mobility management entity, wherein the first control plane signaling carries a data packet that is from a first user equipment (UE), and wherein a target UE of the data packet is a second UE,
　wherein the transmitter is configured to send, to a user subscription database entity, a first request message requesting first route information,
　wherein the receiver is further configured to receive the first route information that is sent according to the first request message by a second MTC-IWF entity that serves the second UE, wherein the first request message is forwarded by the user subscription database entity to the second MTC-IWF entity, and wherein the first route information indicates the second MTC-IWF entity, and
　wherein the transmitter is further configured to send, to the second MTC-IWF entity, second control plane signaling according to the first route information, the second control plane signaling carrying the data packet.

2. The first MTC-IWF entity according to claim 1, wherein the first route information is determined by the user subscription database entity according to the first request message.

3. The first MTC-IWF entity according to claim 1, wherein a second mobility management entity serves the second UE.

4. The first MTC-IWF entity according to claim 1, wherein the processor is configured to parse the data packet, to acquire information about the second UE or a service identifier of the data packet.

5. A machine type communication-interworking function (MTC-IWF) entity comprising:
　a processor configured to determine second route information, wherein the second route information indicates a second mobility management entity, and wherein the MTC-IWF entity and the second mobility management entity both serve a second UE;
　a transmitter configured to send first route information to a first MTC-IWF entity, wherein the first route information indicates the MTC-IWF entity; and a receiver configured to receive second control plane signaling that is sent by the first MTC-IWF entity according to the first route information, wherein the second control plane signaling carries a data packet that is from a first UE, and wherein a target UE of the data packet is the second UE, wherein the transmitter is further configured to send, to the second mobility management entity according to the second route information, third control plane signaling carrying the data packet.

6. The MTC-IWF entity according to claim 5, wherein the receiver is configured to receive a first request message from a user subscription database entity, before the processor determines the second route information, wherein the first request message is received by the user subscription database entity from the first MTC-IWF entity, and wherein the first request message is used for requesting the first route information.

7. The MTC-IWF entity according to claim 6, wherein the transmitter is configured to send the first route information to the first MTC-IWF entity according to the first request message.

8. The MTC-IWF entity according to claim 6, wherein the transmitter is configured to send a third request message to the user subscription database entity according to the first request message, wherein the third request message is used for requesting the second route information, and wherein the receiver is configured to receive the second route information that is sent by the user subscription database entity according to the third request message.

9. The MTC-IWF entity according to claim 5, wherein the receiver is configured to receive a second request message from a user subscription database entity before the processor determines the second route information, wherein the second request message is used for instructing to send the first route information to the first MTC-IWF entity, wherein the second request message is sent by the user subscription database entity according to a first request message, wherein the first request message is received by the user subscription database entity from the first MTC-IWF entity, and wherein the first request message is used for requesting the first route information.

10. The MTC-IWF entity according to claim 9, wherein the transmitter is configured to send the first route information to the first MTC-IWF entity according to the second request message.

11. The MTC-IWF entity according to claim 9, wherein the receiver is configured to acquire the second route information carried in the second request message.

12. A method, comprising:
receiving, by a first machine type communication-interworking function (MTC-IWF) entity, first control plane signaling from a first mobility management entity, wherein the first control plane signaling carries a data packet that is from a first user equipment (UE), and a target receive end of the data packet is a second UE;
sending, by the first MTC-IWF to a user subscription database entity, a first request message requesting first route information;
receiving, by the first MTC-IWF, the first route information that is sent according to the first request message by a second MTC-IWF entity that serves the second UE, wherein the first request message is forwarded by the user subscription database entity to the second MTC-IWF entity, and wherein the first route information indicates the second MTC-IWF entity; and
sending, by the first MTC-IWF entity to the second MTC-IWF entity according to the first route information, second control plane signaling carrying the data packet.

13. The method according to claim 12, wherein the first route information is determined by the user subscription database entity according to the first request message.

14. The method according to claim 13, wherein after sending the second control plane signaling to the second MTC-IWF entity according to the first route information, the second MTC-IWF entity sends the data packet to the second UE using a second mobility management entity, wherein the second mobility management entity serves the second UE.

* * * * *